United States Patent
Kang et al.

(10) Patent No.: US 12,456,053 B2
(45) Date of Patent: Oct. 28, 2025

(54) NEURAL CORE, NEURAL PROCESSOR, AND DATA PROCESSING METHOD THEREOF

(71) Applicant: Rebellions Inc., Seongnam-si (KR)

(72) Inventors: Minhoo Kang, Seongnam-si (KR); Wongyu Shin, Seongnam-si (KR)

(73) Assignee: Rebellions Inc., Seongnam-si (KR)

( * ) Notice: Subject to any disclaimer, the term of this patent is extended or adjusted under 35 U.S.C. 154(b) by 0 days.

(21) Appl. No.: 18/759,661

(22) Filed: Jun. 28, 2024

(65) Prior Publication Data

US 2024/0354572 A1    Oct. 24, 2024

Related U.S. Application Data

(62) Division of application No. 18/508,156, filed on Nov. 13, 2023, now Pat. No. 12,061,983.

(30) Foreign Application Priority Data

Dec. 27, 2022    (KR) .................... 10-2022-0185936

(51) Int. Cl.
*G06F 3/06* (2006.01)
*G06N 3/063* (2023.01)
*G06N 3/08* (2023.01)

(52) U.S. Cl.
CPC ............. *G06N 3/08* (2013.01); *G06F 3/0625* (2013.01); *G06F 3/0659* (2013.01); *G06F 3/0673* (2013.01); *G06N 3/063* (2013.01)

(58) Field of Classification Search
None
See application file for complete search history.

(56) References Cited

U.S. PATENT DOCUMENTS

| 11,537,838 B2 | 12/2022 | Norden et al. |
| 11,861,401 B2 | 1/2024 | Yoon |
| 2018/0121796 A1* | 5/2018 | Deisher .................. G10L 15/16 |

(Continued)

FOREIGN PATENT DOCUMENTS

| KR | 10-2020-0143479 A | 12/2020 |
| KR | 10-2258566 B1 | 6/2021 |

(Continued)

OTHER PUBLICATIONS

Office Action for KR 10-2022-0185936 by Korean Intellectual Property Office dated Sep. 6, 2024.

*Primary Examiner* — Scott C Sun
(74) *Attorney, Agent, or Firm* — BROADVIEW IP LAW, PC

(57) ABSTRACT

A neural core, a neural processor, and a data processing method thereof are provided. The neural core includes a processing unit configured to generate output activation by performing calculation of input activation and a weight, a memory load/store unit configured to generate a memory calculation request requesting one-dimensional calculation of summing the output activation and target data, and a memory configured to receive the output activation and the memory calculation request, import the target data from a memory address in response to the memory calculation request, generate output data by performing the one-dimensional calculation of the target data and the output activation, and store the generated output data in the memory address.

10 Claims, 33 Drawing Sheets

(56) References Cited

U.S. PATENT DOCUMENTS

2021/0192326 A1  6/2021  Park
2023/0214636 A1  7/2023  Lee

FOREIGN PATENT DOCUMENTS

| KR | 10-2021-0081663 A | 7/2021 |
| KR | 10-2480287 B1 | 12/2022 |
| KR | 10-2480300 B1 | 12/2022 |

\* cited by examiner

NEURAL CORE, NEURAL PROCESSOR, AND DATA PROCESSING METHOD THEREOF

CROSS-REFERENCE TO RELATED APPLICATION

This application is a divisional application of U.S. patent application Ser. No. 18/508,156, filed on Nov. 13, 2023, which claims priority under 35 U.S.C § 119 to Korean Patent Application No. 10-2022-0185936, filed on Dec. 27, 2022, in the Korean Intellectual Property Office, the entire contents of which is hereby incorporated by reference.

TECHNICAL FIELD

The disclosure relates to a neural core, a neural processor, and a data processing method thereof. Specifically, the disclosure relates to a neural core, a neural processor, and a data processing method thereof with improved data processing efficiency by performing one-dimensional calculation in an on-chip memory.

BACKGROUND

For the last few years, artificial intelligence technology has been the core technology of the Fourth Industrial Revolution and the subject of discussion as the most promising technology worldwide. The biggest problem with such artificial intelligence technology is computing performance. For artificial intelligence technology to realize a level of human learning ability, reasoning ability, perceptual ability, natural language implementation ability, etc., it is of utmost important to process a large amount of data quickly.

The central processing unit (CPU) or graphics processing unit (GPU) of off-the-shelf computers was used to implement deep-learning training and inference in early artificial intelligence, but these components had limitations in their ability to perform the tasks of deep-learning training and inference with high workloads. Thus, neural processing units (NPUs) that are structurally specialized for deep learning tasks have received a lot of attention.

Recently, in order to maximize the amount of calculation, the number of neural cores in a neural processing device has been gradually increased, and power consumption and calculation complexity have been increased in proportion to the increased number of neural cores. That is, there is a demand for a method and technology that may increases the energy efficiency and data processing efficiency of neural cores.

The description set forth in the background section should not be assumed to be prior art merely because it is set forth in the background section. The background section may describe aspects or embodiments of the disclosure.

SUMMARY

Aspect of the disclosure provide a neural core with improved data processing efficiency by performing one-dimensional calculation by using an on-chip memory.

Aspects of the disclosure provide a neural processor with improved data processing efficiency by performing one-dimensional calculation by using an on-chip memory.

Aspects of the disclosure provide a data processing method of a neural core with improved data processing efficiency by performing one-dimensional calculation by using an on-chip memory.

According to some aspects of the disclosure, a neural core includes a processing unit configured to generate output activation by performing calculation of input activation and a weight, a memory load/store unit configured to generate a memory calculation request requesting one-dimensional calculation of summing the output activation and target data, and a memory configured to receive the output activation and the memory calculation request, import the target data from a memory address in response to the memory calculation request, generate output data by performing the one-dimensional calculation of the target data and the output activation, and store the generated output data in the memory address.

According to some aspects, the memory includes a one-dimensional calculation module configured to perform the one-dimensional calculation.

According to some aspects, the memory includes at least one local memory bank, and a scheduler configured to manage data being stored and loaded in the at least one local memory bank, and the one-dimensional calculation module is configured to correspond to the at least one local memory bank.

According to some aspects, the at least one local memory bank includes a local memory bank controller, a local memory bank cell array that is controlled by the local memory controller and includes at least one memory address, and a port configured to exchange data between the local memory bank cell array and the local memory bank controller.

According to some aspects, the port is configured as a single port or a dual port.

According to some aspects, the one-dimensional calculation module is included in the local memory bank controller.

According to some aspects, the one-dimensional calculation module is included in the local memory bank cell array.

According to some aspects, the one-dimensional calculation module includes an adder configured to sum the output activation provided as a first input value and the target data provided as a second input value and output the output data.

According to some aspects, the processing unit includes a column register, a row register, and a processing element array, the column register inputs a first input to the processing element array, the row register inputs a second input to the processing element array, the first input is one of the input activation and the weight, and the second input is the other of the input activation and the weight, and the processing element array generates the output activation by performing the one-dimensional calculation of the input activation and the weight.

According to some aspects, the processing unit further includes a calculation control unit configured to receive the generated output activation, the calculation control unit generates a memory calculation instruction requesting the one-dimensional calculation of the output activation and provides the output activation and the memory calculation instruction to the memory load/store unit, and the memory load/store unit generates the memory calculation request in response to the memory calculation instruction.

According to some aspects, the memory load/store unit includes a load/store unit (LSU) configured to transmit data, a control signal, and a synchronization signal from outside to the memory, a weight buffer configured to receive and temporarily store the weight from the memory, and transmit the received weight to the processing unit, an activation LSU configured to perform input and output processes for activation between the memory and the processing unit, and an activation buffer arranged between the processing unit and the activation LSU to temporarily store the input activation or the output activation.

According to some aspects of the disclosure, a neural processor includes at least one neural core, a task manager configured to generate task information corresponding to a task provided from outside, and a core global configured to transmit the task information to the at least one neural core, wherein the task information includes a first task for generating output activation through calculation of input activation and a weight, and a second task for generating output data by performing one-dimensional calculation of summing the output activation and target data, and the at least one neural core includes a processing unit that performs calculation related to the first task and a memory that performs calculation related to the second task.

According to some aspects, the at least one neural core further includes a memory load/store unit configured to generate a memory calculation request requesting one-dimensional calculation of summing the output activation and target data, and the memory receives the output activation and the memory calculation request, imports the target data from a memory address in response to the memory calculation request, generates the output data by performing the one-dimensional calculation of the target data and the output activation, and stores the generated output data in the memory address.

According to some aspects, the memory includes at least one local memory bank, a scheduler configured to manage storage and loading of data in the at least one local memory bank, and a one-dimensional calculation module configured to perform the one-dimensional calculation, and the one-dimensional calculation module is configured to correspond to the at least one local memory bank.

According to some aspects, the at least one local memory bank includes a local memory bank controller, a local memory bank cell array that is controlled by the local memory controller and includes at least one memory address, and a port configured to exchange data between the local memory bank cell array and the local memory bank controller.

According to some aspects, the port is configured as a single port or a dual port.

According to some aspects, the one-dimensional calculation module is included in the local memory bank controller.

According to some aspects, the one-dimensional calculation module is included in the local memory bank cell array.

According to some aspects of the disclosure, a data processing method of a neural core includes generating output activation by performing calculation of input activation and a weight, generating a memory calculation request requesting one-dimensional calculation of summing the output activation and target data, importing the target data from a memory address in response to the memory calculation request, generating output data by performing the one-dimensional calculation of the target data and the output activation, and storing the generated output data in the memory address.

According to some aspects, generating the memory calculation request includes generating a memory calculation instruction requesting one-dimensional calculation of the output activation, providing the output activation and the memory calculation instruction, and generating the memory calculation request in response to the memory calculation instruction.

Aspects of the disclosure are not limited to those mentioned above and other objects and advantages of the disclosure that have not been mentioned can be understood by the following description and will be more clearly understood according to embodiments of the disclosure. In addition, it will be readily understood that the objects and advantages of the disclosure can be realized by the means and combinations thereof set forth in the claims.

In the neural core, the neural processor, and the data processing method thereof according to the disclosure, the neural core may perform two-dimensional convolution calculations, the on-chip memory may perform one-dimensional calculations, respectively. Thus, it is possible to ameliorate problems of decreasing efficiency of data processing and balancing generated by performing both two-dimensional convolution calculations and one-dimensional calculations in the producing unit.

In addition, the neural core, the neural processor and the data processing method thereof according to the disclosure may decrease the amount of power consumption and energy by performing one-dimensional calculations in memory, not importing functions and data for one-dimensional calculations to the processing unit.

In addition to the foregoing, the specific effects of the disclosure will be described together while elucidating the specific details for carrying out the embodiments below.

DETAILED DESCRIPTION OF THE PREFERRED EMBODIMENTS

Figure 1:
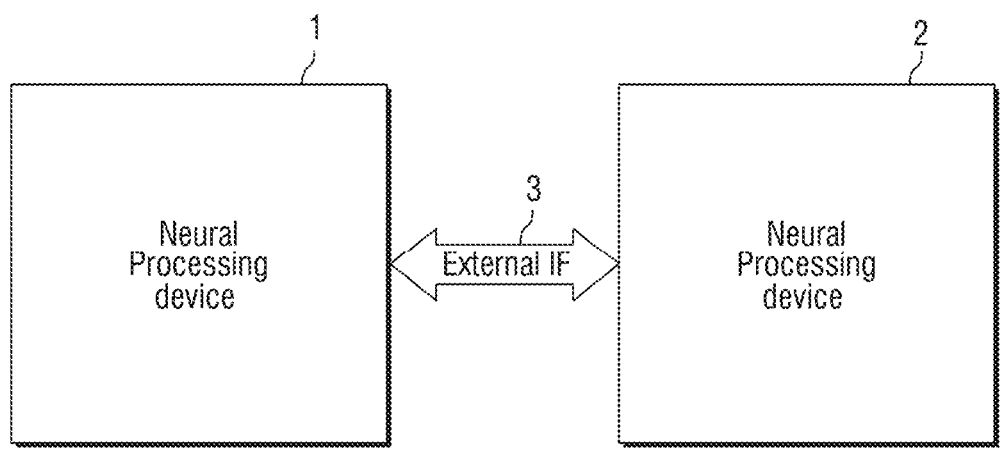
FIG. 1 is a block diagram for illustrating a neural processing system in accordance with some embodiments of the disclosure.

The terms or words used in the disclosure and the claims should not be construed as limited to their ordinary or lexical meanings. They should be construed as the meaning and concept in line with the technical idea of the disclosure based on the principle that the inventor can define the concept of terms or words in order to describe his/her own embodiments in the best possible way. Further, since the embodiment described herein and the configurations illustrated in the drawings are merely one embodiment in which the disclosure is realized and do not represent all the technical ideas of the disclosure, it should be understood that there may be various equivalents, variations, and applicable examples that can replace them at the time of filing this application.

Although terms such as first, second, A, B, etc. used in the description and the claims may be used to describe various components, the components should not be limited by these terms. These terms are used only for the purpose of distinguishing one component from another. For example, a first component may be referred to as a second component, and similarly, a second component may be referred to as a first component, without departing from the scope of the disclosure. The term 'and/or' includes a combination of a plurality of related listed items or any item of the plurality of related listed items.

The terms used in the description and the claims are merely used to describe particular embodiments and are not intended to limit the disclosure. Singular expressions include plural expressions unless the context explicitly indicates otherwise. In the application, terms such as "comprise," "have," "include", "contain," etc. should be understood as not precluding the possibility of existence or addition of features, numbers, steps, operations, components, parts, or combinations thereof described herein. Terms such as a "circuit" or "circuitry", refers to a circuit in hardware but may also refer to a circuit in software.

Unless otherwise defined, the phrases "A, B, or C," "at least one of A, B, or C," or "at least one of A, B, and C" may refer to only A, only B, only C, both A and B, both A and C, both B and C, all of A, B, and C, or any combination thereof.

Unless otherwise defined, all terms used herein, including technical or scientific terms, have the same meaning as commonly understood by those of ordinary skill in the art to which the disclosure pertains.

Terms such as those defined in commonly used dictionaries should be construed as having a meaning consistent with the meaning in the context of the relevant art, and are not to be construed in an ideal or excessively formal sense unless explicitly defined in the disclosure.

In addition, each configuration, procedure, process, method, or the like included in each embodiment of the disclosure may be shared to the extent that they are not technically contradictory to each other.

Hereinafter, a neural processing device according to some embodiments of the disclosure is described with reference to FIGS. 1 to 31.

FIG. 1 is a block diagram illustrating a neural processing system in accordance with some embodiments of the disclosure.

Referring to FIG. 1, a neural processing system NPS in accordance with some embodiments may include a first neural processing device 1, a second neural processing device 2, and an external interface 3.

The first neural processing device 1 may be a device that performs calculations using an artificial neural network. The first neural processing device 1 may be, for example, a device specialized in performing tasks of deep learning computations. However, the embodiment is not limited thereto.

The second neural processing device 2 may be a device having the same or similar configuration as the first neural processing device 1. The first neural processing device 1 and the second neural processing device 2 may be connected to each other via the external interface 3 and share data and control signals.

Although FIG. 1 shows two neural processing devices, the neural processing system NPS in accordance with some embodiments is not limited thereto. That is, in a neural processing system NPS in accordance with some embodiments, three or more neural processing devices may be connected to each other via the external interface 3. Also, conversely, a neural processing system NPS in accordance with some embodiments may include only one neural processing device.

In this case, the first neural processing device 1 and the second neural processing device 2 may each be a processing device other than the neural processing device. That is, the first neural processing device 1 and the second neural processing device 2 may each be a graphics processing unit (GPU), a central processing unit (CPU), and other types of processing units as well. In the following, the first neural processing device 1 and the second neural processing device 2 will be described as neural processing devices for convenience.

Figure 2:
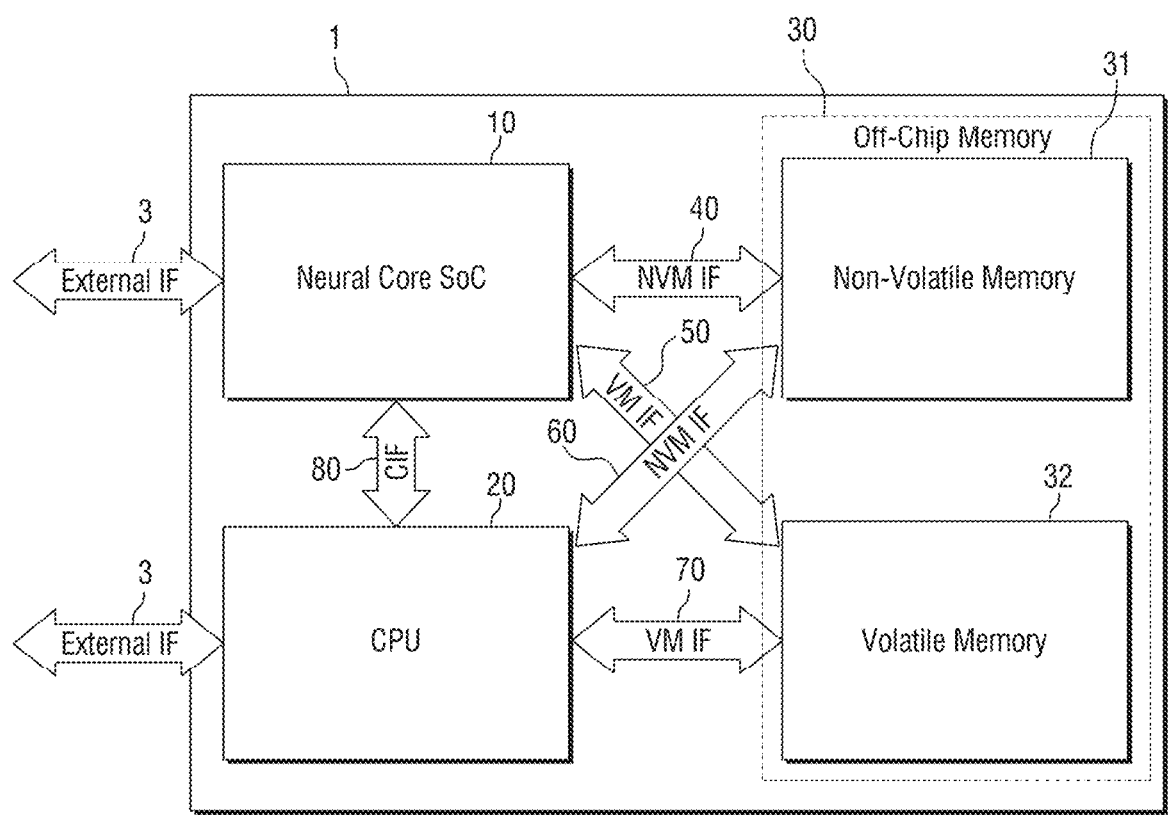
FIG. 2 is a block diagram for illustrating a neural processing device of FIG. 1.

FIG. 2 is a block diagram for illustrating the neural processing device of FIG. 1.

Referring to FIG. 2, a first neural processing device 1 may include a neural core SoC 10, a CPU 20, an off-chip memory 30, a first non-volatile memory interface 40, a first volatile memory interface 50, a second non-volatile memory interface 60, a second volatile memory interface 70 and a control interface (CIF) 80.

The neural core SoC 10 may be a system on a chip device. The neural core SoC 10 can be an artificial intelligence computation device and may be an accelerator. The neural core SoC 10 may be, for example, any one of a graphics processing unit (GPU), a field-programmable gate array (FPGA), or an application-specific integrated circuit (ASIC). However, the embodiment is not limited thereto.

The neural core SoC 10 may exchange data with other external computation devices via the external interface 3. Further, the neural core SoC 10 may be connected to the non-volatile memory 31 and the volatile memory 32 via the first non-volatile memory interface 40 and the first volatile memory interface 50, respectively.

The CPU 20 may be a control device that controls the system of the first neural processing device 1 and executes program computations. The CPU 20 is a general-purpose computation device and may have low efficiency in performing simple parallel computations that are frequently used in deep learning. Accordingly, there can be high efficiency by performing computations in deep learning inference and training tasks by the neural core SoC 10.

The CPU 20 may exchange data with other external computation units via the external interface 3. Further, the CPU 20 may be connected to the non-volatile memory 31 and the volatile memory 32 via the second non-volatile memory interface 60 and the second volatile memory interface 70, respectively.

The CPU 20 may also transfer tasks to the neural core SoC 10 via commands. At this time, the CPU 20 may be a kind of host that gives instructions to the neural core SoC 10. That is, the neural core SoC 10 can efficiently perform parallel computation tasks such as deep learning tasks according to the instructions of the CPU 20.

The off-chip memory 30 may be a memory disposed outside the chip of the neural core SoC 10. The off-chip memory 30 may include a non-volatile memory 31 and a volatile memory 32.

The non-volatile memory 31 may be a memory that continuously retains stored information even if electric power is not supplied. The non-volatile memory 31 may include, for example, at least one of Read-Only Memory (ROM), Programmable Read-Only Memory (PROM), Erasable Alterable ROM (EAROM), Erasable Programmable Read-Only Memory (EPROM), Electrically Erasable Programmable Read-Only Memory (EEPROM) (e.g., NAND Flash memory, NOR Flash memory), Ultra-Violet Erasable Programmable Read-Only Memory (UVEPROM), Ferroelectric Random-Access Memory (FeRAM), Magnetoresistive Random-Access Memory (MRAM), Phase-change Random-Access Memory (PRAM), silicon-oxide-nitride-oxide-silicon (SONOS), Resistive Random-Access Memory (RRAM), Nanotube Random-Access Memory (NRAM), magnetic computer storage devices (e.g., hard disks, diskette drives, magnetic tapes), optical disc drives, or 3D XPoint memory. However, the embodiment is not limited thereto.

The volatile memory 32 may be a memory that continuously requires electric power to retain stored information, unlike the non-volatile memory 31. The volatile memory 32 may include, for example, at least one of Dynamic Random-Access Memory (DRAM), Static Random-Access Memory (SRAM), Synchronous Dynamic Random-Access Memory (SDRAM), or Double Data Rate SDRAM (DDR SDRAM). However, the embodiment is not limited thereto.

Each of the first non-volatile memory interface 40 and the second non-volatile memory interface 60 may include, for example, at least one of Parallel Advanced Technology Attachment (PATA), Small Computer System Interface (SCSI), Serial Attached SCSI (SAS), Serial Advanced Technology Attachment (SATA), or PCI Express (PCIe). However, the embodiment is not limited thereto.

Each of the first volatile memory interface 50 and the second volatile memory interface 70 may be, for example, at least one of SDR (Single Data Rate), DDR (Double Data Rate), QDR (Quad Data Rate), or XDR (eXtreme Data Rate, Octal Data Rate). However, the embodiment is not limited thereto.

The control interface 80 may be an interface for transferring control signals between the CPU 20 and the neural core SoC 10. The control interface 80 may transmit commands of the CPU 20 and transmit responses thereto of the neural core SoC 10. The control interface 80 may be, for example, PCIe (PCI Express), but is not limited thereto.

Figure 3:
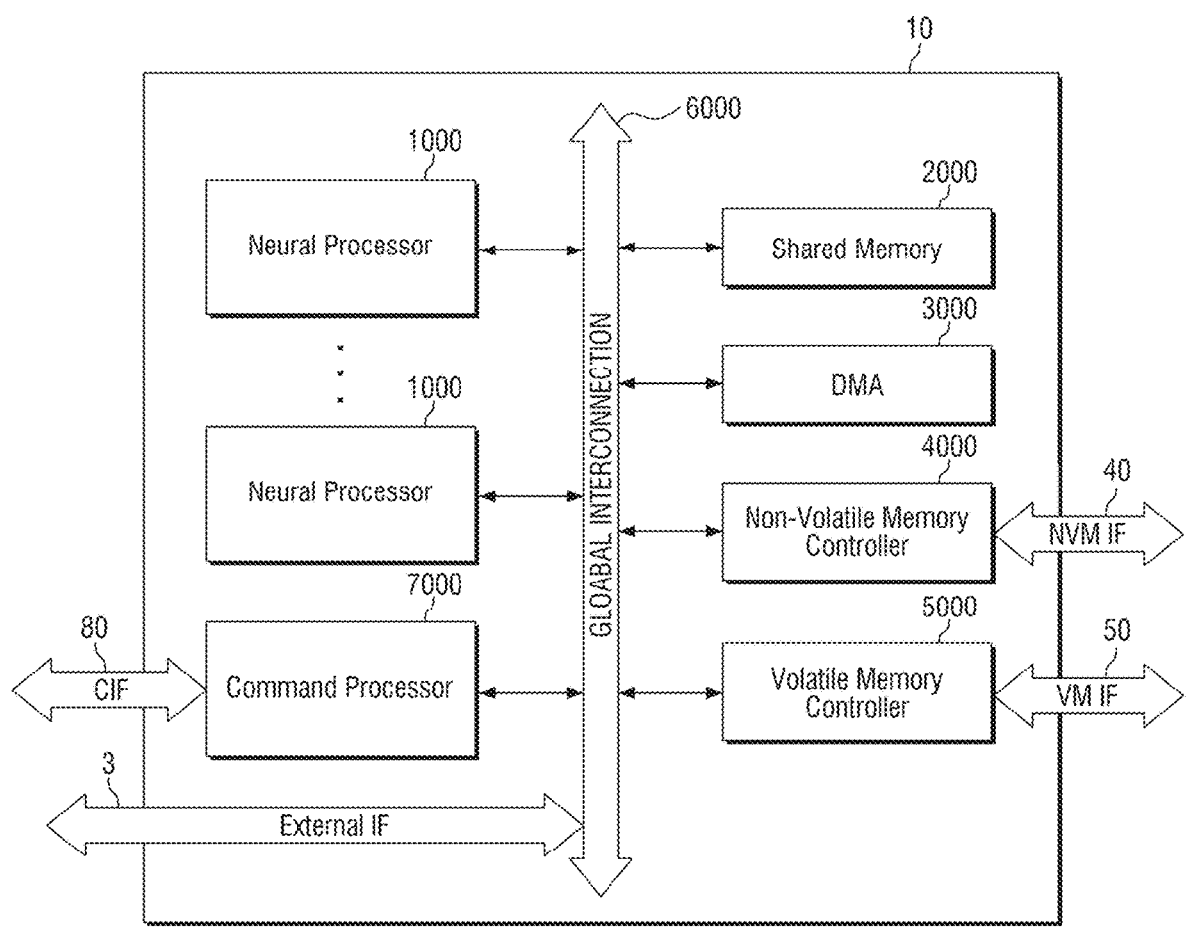
FIG. 3 is a block diagram for illustrating the neural core SoC of FIG. 2.

FIG. 3 is a block diagram for illustrating the neural core SoC of FIG. 2.

Referring to FIGS. 2 and 3, the neural core SoC 10 may include at least one neural processor 1000, a shared memory 2000, a direct memory access (DMA) 3000, a non-volatile memory controller 4000, a volatile memory controller 5000, a command processor 7000, and a global interconnection 6000.

The neural processor 1000 may be a computation device that directly performs computation tasks. If there exist neural processors 1000 in plurality, computation tasks may be assigned to respective neural processors 1000. The respective neural processors 1000 may be connected to each other via the global interconnection 6000.

The shared memory 2000 may be a memory shared by multiple neural processors 1000. The shared memory 2000 may store data of each neural processor 1000. In addition, the shared memory 2000 may receive data from the off-chip memory 30, store the data temporarily, and transfer the data to each neural processor 1000. The shared memory 2000 may also receive data from the neural processor 1000, store the data temporarily, and transfer the data to the off-chip memory 30 of FIG. 2.

The shared memory 2000 may be required to be a relatively high-speed memory. Accordingly, the shared memory 2000 may include, for example, an SRAM. However, the embodiment is not limited thereto. That is, the shared memory 2000 may include a DRAM as well.

The shared memory 2000 may be a memory corresponding to the SoC level, i.e., level 2 (L2). Accordingly, the shared memory 2000 may also be defined as an L2 shared memory.

The DMA 3000 may directly control movements of data without needs for the neural processor 1000 or CPU 20 to control the input/output of data. Accordingly, the DMA 3000 may control data movements between memories, thereby minimizing a number of interrupts of the neural processor 1000 or CPU 20.

The DMA 3000 may control the data movements between the shared memory 2000 and the off-chip memory 30. Via the authority of the DMA 3000, the non-volatile memory controller 4000 and the volatile memory controller 5000 may perform movements of data.

The non-volatile memory controller 4000 may control tasks of reading from or writing onto the non-volatile memory 31. The non-volatile memory controller 4000 may control the non-volatile memory 31 via the first non-volatile memory interface 40. In this case, the non-volatile memory controller 4000 may be referred to as a non-volatile memory controller circuit, but for the sake of convenience, the terms are unified as a non-volatile memory controller. In addition, the non-volatile memory controller 4000 may be implemented as a circuit or circuitry.

The volatile memory controller 5000 may control tasks of reading from or writing onto the volatile memory 32. Further, the volatile memory controller 5000 may perform a refresh task of the volatile memory 32. The volatile memory controller 5000 may control the volatile memory 32 via the first volatile memory interface 50. Likewise, the volatile memory controller 5000 may be referred to as a volatile memory controller circuit, but for the sake of convenience, the terms are unified as a volatile memory controller. In addition, the volatile memory controller 5000 may be implemented as a circuit or circuitry.

The command processor 7000 may be connected to the control interface 80. The command processor 7000 may receive control signals from the CPU 20 via the control interface 80. The command processor 7000 may generate tasks via the control signals received from the CPU 20 and transmit the control signals to each neural processor 1000. Further, the command processor 7000 may receive completion reports for the tasks from each neural processor 1000.

The global interconnection 6000 may connect the at least one neural processor 1000, the shared memory 2000, the DMA 3000, the non-volatile memory controller 4000, the command processor 7000, and the volatile memory controller 5000 to one another. In addition, the external interface 3 may also be connected to the global interconnection 6000. The global interconnection 6000 may be a path through which data travel between the at least one neural processor 1000, the shared memory 2000, the DMA 3000, the non-volatile memory controller 4000, the volatile memory controller 5000, the command processor 7000, and the external interface 3.

The global interconnection 6000 may transmit not only data but also control signals and signals for synchronization. In the neural processing device in accordance with some embodiments of the disclosure, each neural processor 1000 may directly transmit and receive the synchronization signals. Accordingly, latencies due to transmissions of the synchronization signals generated by the command processor 7000 can be minimized.

In other words, if there exist neural processors 1000 in plurality, there may be dependencies of individual tasks in which a task of one neural processor 1000 needs to be finished before the next neural processor 1000 can start a new task. The end and start of these individual tasks can be checked via the synchronization signals, and in the conventional techniques, the command processor 7000 or the host, i.e., the CPU 20, was exclusively responsible for both receiving these synchronization signals and instructing the start of a new task.

However, as the number of neural processors 1000 increases and task dependencies are designed more complicatedly, the number of requests and instructions for this synchronization task can increase exponentially. Therefore, the latency resulting from each request and instruction can greatly reduce the efficiency of tasks.

Therefore, in the neural processing device in accordance with some embodiments of the disclosure, each neural processor 1000, instead of the command processor 7000, may directly transmit some of the synchronization signals to other neural processors 1000 according to task dependencies. In this case, several neural processors 1000 can perform the synchronization tasks in parallel as compared with the method managed by the command processor 7000, thereby minimizing the latency due to synchronization.

In addition, the command processor 7000 needs to perform the task scheduling of the neural processors 1000 according to a task dependency, and the overhead of such scheduling may increase significantly as the number of neural processors 1000 increases. Therefore, in the neural processing device in accordance with some embodiments of the disclosure, scheduling tasks are also performed in part by individual neural processors 1000, and hence scheduling burden resulting therefrom can be reduced, thereby improving the performance of the device.

Figure 4:
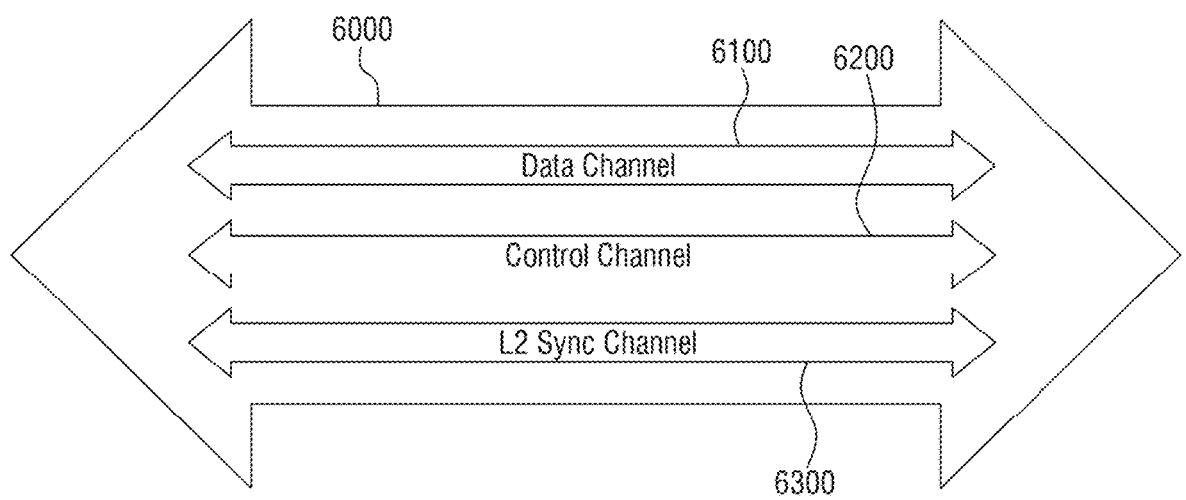
FIG. 4 is a structural diagram for illustrating the global interconnection of FIG. 3.

FIG. 4 is a structural diagram for illustrating the global interconnection of FIG. 3.

Referring to FIG. 4, the global interconnection 6000 may include a data channel 6100, a control channel 6200, and an L2 sync channel 6300.

The data channel 6100 may be a dedicated channel for transmitting data. Through the data channel 6100, the at least one neural processor 1000, the shared memory 2000, the DMA 3000, the non-volatile memory controller 4000, the volatile memory controller 5000, and the external interface 3 may exchange data with one another.

The control channel 6200 may be a dedicated channel for transmitting control signals. Through the control channel 6200, the at least one neural processor 1000, the shared memory 2000, the DMA 3000, the non-volatile memory controller 4000, the volatile memory controller 5000, the command processor 7000, and the external interface 3 may exchange control signals with one another. In particular, the command processor 7000 may transmit various control signals to each neural processor 1000.

The L2 sync channel 6300 may be a dedicated channel for transmitting synchronization signals. Through the L2 sync channel 6300, the at least one neural processor 1000, the shared memory 2000, the DMA 3000, the non-volatile memory controller 4000, the volatile memory controller 5000, the command processor 7000, and the external interface 3 may exchange synchronization signals with one another.

The L2 sync channel 6300 may be set as a dedicated channel inside the global interconnection 6000, and thus, may not overlap with other channels and transmit synchronization signals quickly. Accordingly, the neural processing device in accordance with some embodiments does not require new wiring work and may smoothly perform the synchronization task by using the global interconnection 6000.

Figure 5:
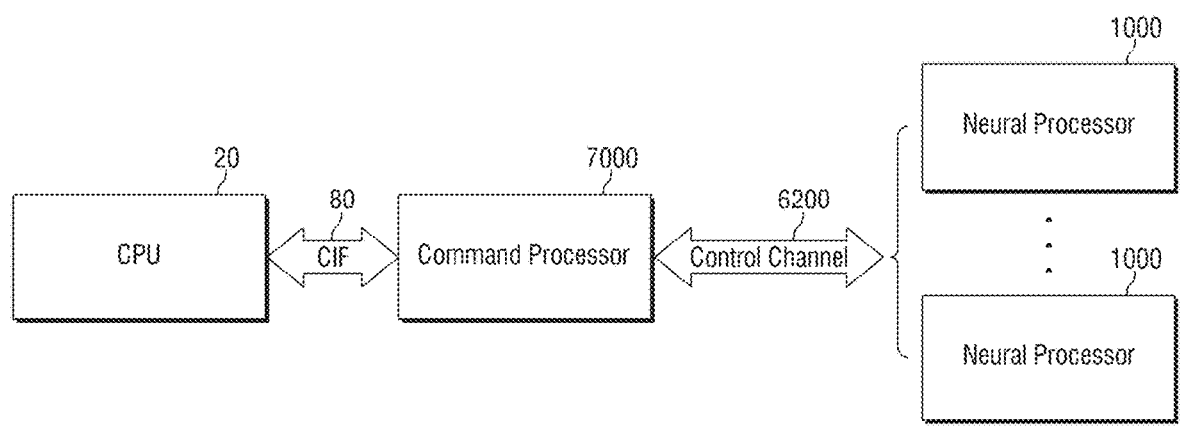
FIG. 5 is a block diagram for illustrating a flow of control signals of the neural processing device of FIG. 1.

FIG. 5 is a block diagram for illustrating a flow of control signals of the neural processing device of FIG. 1.

Referring to FIG. 5, the CPU 20 may transfer control signals to the command processor 7000 via the control interface 80. In this case, a control signal may be a signal instructing execution of each operation, such as a computation task or a data load/store task.

The command processor 7000 may receive the control signals and transfer the control signals to at least one neural processor 1000 via the control channel 6200. Each control signal may be stored in the neural processor 1000 as each task.

Figure 6:
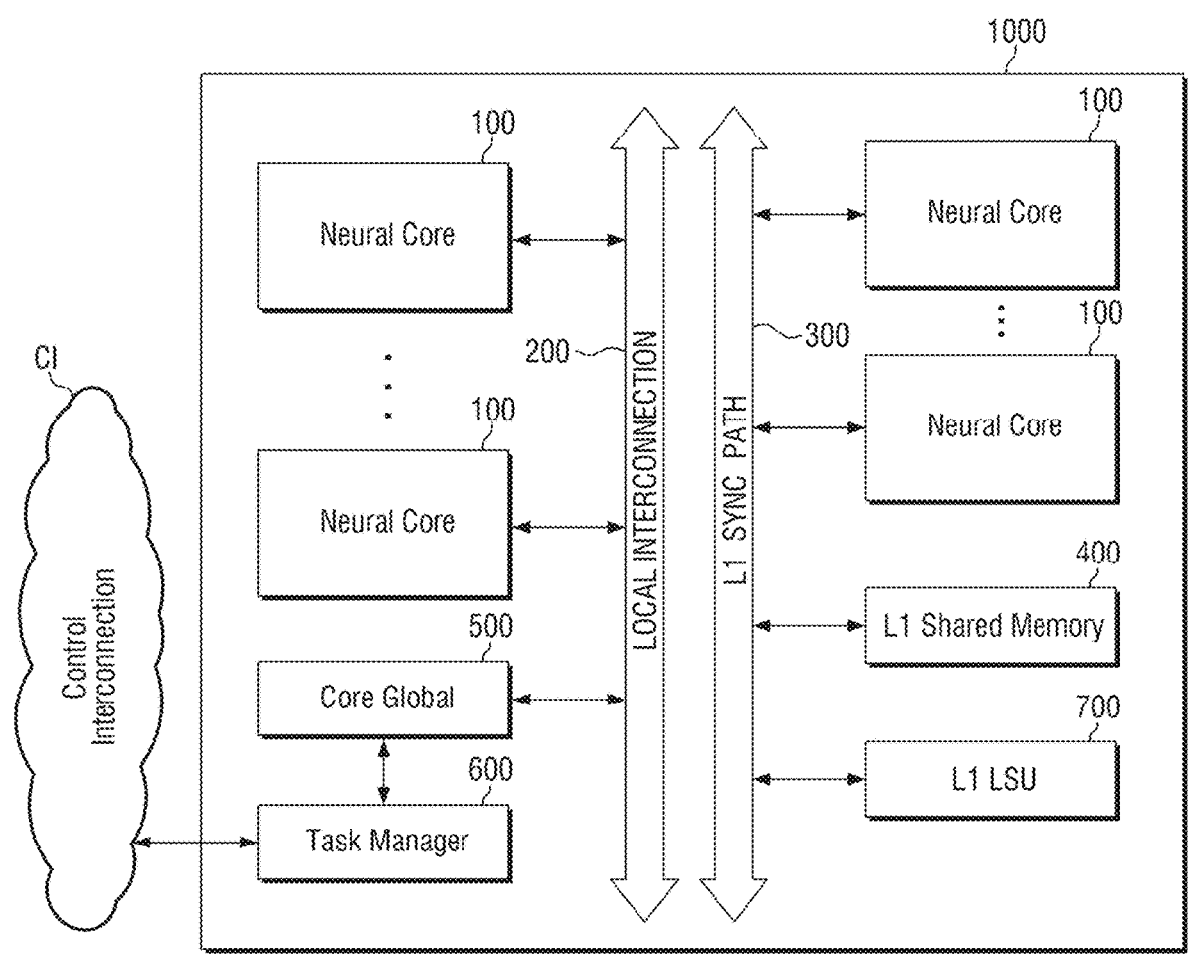
FIG. 6 is a block diagram for illustrating the neural processor of FIG. 3 in detail.

FIG. 6 is a block diagram for illustrating the neural processor of FIG. 3 in detail.

Referring to FIGS. 3 to 6, the neural processor 1000 may include at least one neural core 100, a local interconnection 200, an L1 sync path 300, an L1 shared memory 400, a core global 500, a task manager 600, and an L1 load/store unit (LSU) 700. The L1 LSU 700, the task manager 600, and the core global 500 may be referred to respectively as an L1 LSU circuit, a task manager circuit, and a core global circuit, but for the sake of convenience, the terms are respectively unified as an L1 LSU, a task manager, and a core global. In addition, the L1 LSU 700, the task manager 600, and the core global 500 may each be implemented as a circuit or circuitry.

The at least one neural core 100 may divide and perform tasks of the neural processor 1000. The number of neural cores 100 may be, for example, eight. However, the embodiment is not limited thereto. Although FIGS. 3 and 5 illustrate that several neural cores 100 are included in the neural processor 1000, the embodiment is not limited thereto. That is, the neural processor 1000 may include only one neural core 100.

The neural core 100 may receive task information from the core global 500 and perform a task according to the task information. In this case, a task may be defined by a control signal, and the task may be any one of computation operations and memory operations. The memory operation may be, for example, any one of micro-DMA (μDMA), LP micro-DMA (Low Priority μDMA), store μDMA (STμDMA), and a pre-processing task.

The L1 shared memory 400 may be a memory shared by the neural cores 100 in the neural processor 1000. The L1 shared memory 400 may store data of each neural core 100. In addition, the L1 shared memory 400 may receive data from the shared memory 2000 of FIG. 3, temporarily store the data, and transmit the data to the at least one neural core 100. On the other hand, the L1 shared memory 400 may receive data from the at least one neural core 100, temporarily store the data, and transmit the data to the shared memory 2000 of FIG. 3.

The L1 shared memory 400 may be a memory corresponding to the neural processor level, i.e., level 1 (L1). The L2 shared memory, i.e., the shared memory 2000 may be shared by the neural processors 1000, and the L1 shared memory 400 may be shared by the neural cores 100.

The L1 LSU 700 may receive at least one of data, a control signal, or a synchronization signal from the outside through the global interconnection 6000. The L1 LSU 700 may transmit at least one of the received data, the received control signal, or the received synchronization signal to the L1 shared memory 400. Similarly, the L1 LSU 700 may transfer at least one of data, a control signal, or a synchronization signal to the outside through the global interconnection 6000. In addition, the L1 LSU 700 may transmit to and receive from at least one of data, a control signal, or a synchronization signal to the at least one neural core 100.

The at least one neural core 100 may receive task information from the core global 500 and perform a task according to the task information. In this case, the task may be related to computation task (calculation task) or tasks related to a memory operation. The task may be defined by a control signal. The task information is on a task and may be information on a type of a task, a form of a task, additional information on a task, and so on.

The at least one neural core 100 may transmit a completion signal indicating completion of a task to the core global 500.

The task manager 600 may receive a task from a control interconnection CI. In this case, the control interconnection CI may be a generic term for transmission interfaces that transmit tasks from the command processor 7000. That is, the control interconnection CI may include the control channel 6200 and the local interconnection 200.

The task manager 600 may receive a task to generate task information and transmit the task information to the core global 500. In addition, the task manager 600 may receive a completion signal through the core global 500, generate a completion report according thereto, and transmit the completion report to the command processor 7000 through the control interconnection CI.

The core global 500 may be a wire structure connected in hardware within the at least one neural core 100. Although not illustrated in FIG. 6, the core global 500 may have a structure that connects all of the at least one neural core 100, the L1 shared memory 400, the L1 LSU 700, and the task manager 600 to each other. Accordingly, the local interconnection 200 and the L1 sync path 300 may also be included in the core global 500. However, the embodiment is not limited thereto.

The core global 500 may receive task information from the task manager 600, transmit the task information to the at least one neural core 100, and receive a completion signal therefor from the at least one neural core 100. Subsequently, the core global 500 may transmit the completion signal to the task manager 600.

The local interconnection 200 may connect the at least one neural core 100, the L1 shared memory 400, the core global 500, the task manager 600, and the L1 LSU 700 to each other. The local interconnection 200 may be a path through which data moves between the at least one neural core 100, the L1 shared memory 400, the core global 500, the task manager 600, and the L1 LSU 700. The local interconnection 200 may be connected to the global interconnection 6000 of FIG. 3 to transmit data.

The L1 sync path 300 may connect the at least one neural core 100, the L1 shared memory 400, the core global 500, the task manager 600, and the L1 LSU 700 to each other. The L1 sync path 300 may be a path through which synchronization signals of the at least one neural core 100, the L1 shared memory 400, the core global 500, the task manager 600, and the L1 LSU 700 move.

The L1 sync path 300 may be formed physically separately from the local interconnection 200. In the case of the local interconnection 200, sufficient internal channels may not be formed unlike the global interconnection 6000. In this case, the L1 sync path 300 may be formed separately to transmit synchronization signals quickly and without delay. The L1 sync path 300 may be used for synchronization performed at a level lower than a level of the L2 sync channel 6300 of the global interconnection 6000.

Figure 7:
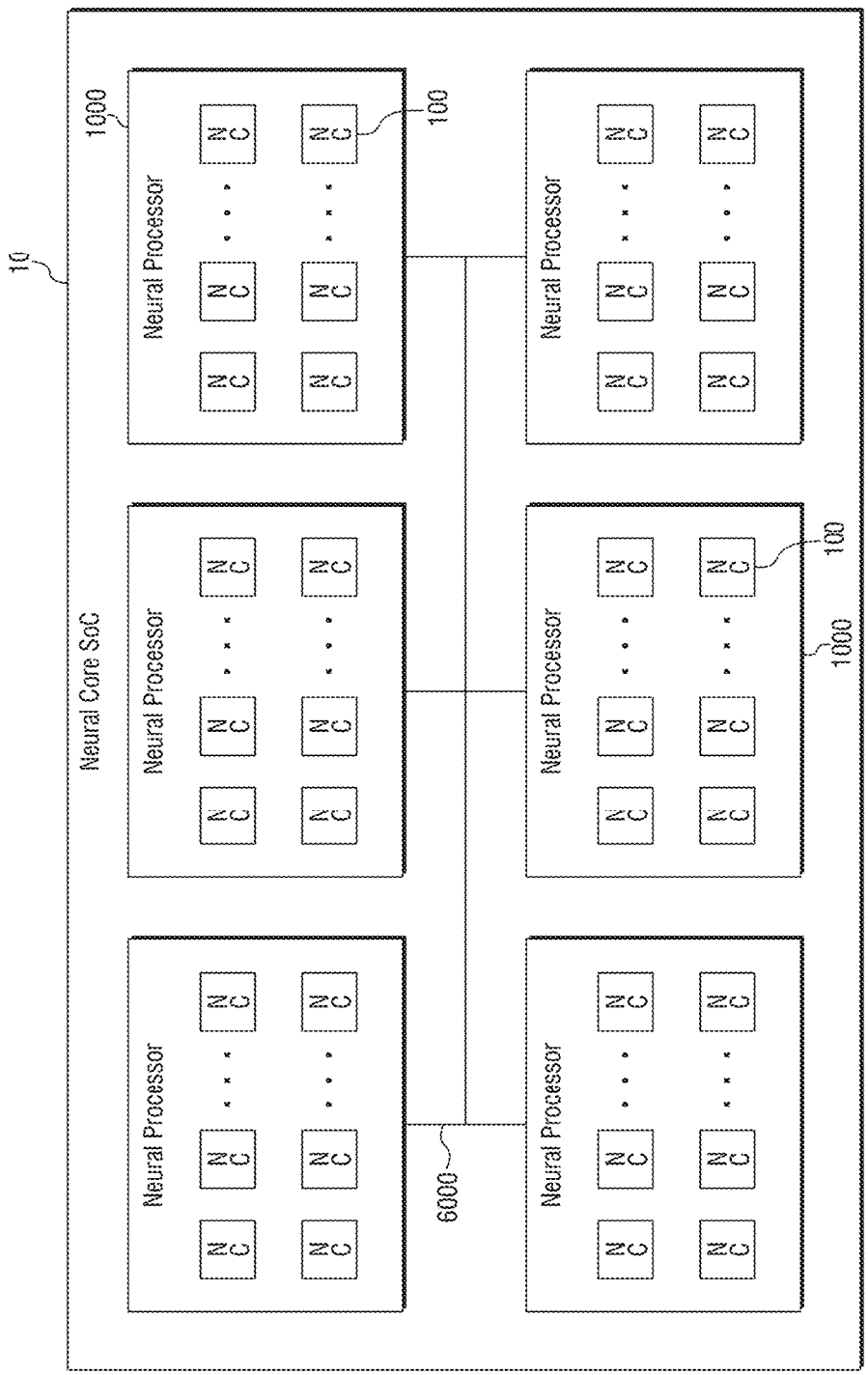
FIG. 7 is a diagram for illustrating a hierarchical structure of a neural processing device in accordance with some embodiments of the disclosure.

FIG. 7 is a diagram illustrating a hierarchical structure of a neural processing apparatus according to some embodiments of the disclosure.

Referring to FIG. 7, the neural core SoC 10 may include at least one neural processor 1000. Each neural processor 1000 may transmit data to each other via the global interconnection 6000.

The neural processors 1000 may each include at least one neural core 100. The neural core 100 may be a unit of processing optimized for deep learning computation tasks. The neural core 100 may be a unit of processing corresponding to one operation of deep learning computation tasks. In other words, a deep learning computation task can be represented by a sequential or parallel combination of multiple operations. The neural cores 100 may each be a unit of processing capable of processing one operation, and may be a minimum computation unit that can be considered for scheduling from the viewpoint of a compiler.

The neural processing device in accordance with the embodiment may configure scales of the minimum computation unit considered from the viewpoint of compiler scheduling and the hardware unit of processing to be the same, so that fast and efficient scheduling and computation tasks can be performed.

That is, if a unit of processing into which hardware can be divided is too large compared to computation tasks, inefficiency of the computation tasks may occur in driving the unit of processing. Conversely, it is not appropriate to schedule a unit of processing that is a unit smaller than an operation, which is the minimum scheduling unit of the compiler, every time since a scheduling inefficiency may occur and hardware design costs may increase.

Therefore, by adjusting the scales of the scheduling unit of the compiler and the hardware unit of processing to be similar in the embodiment, it is possible to simultaneously satisfy the fast scheduling of computation tasks and the efficient execution of the computation tasks without wasting hardware resources.

Figure 8:
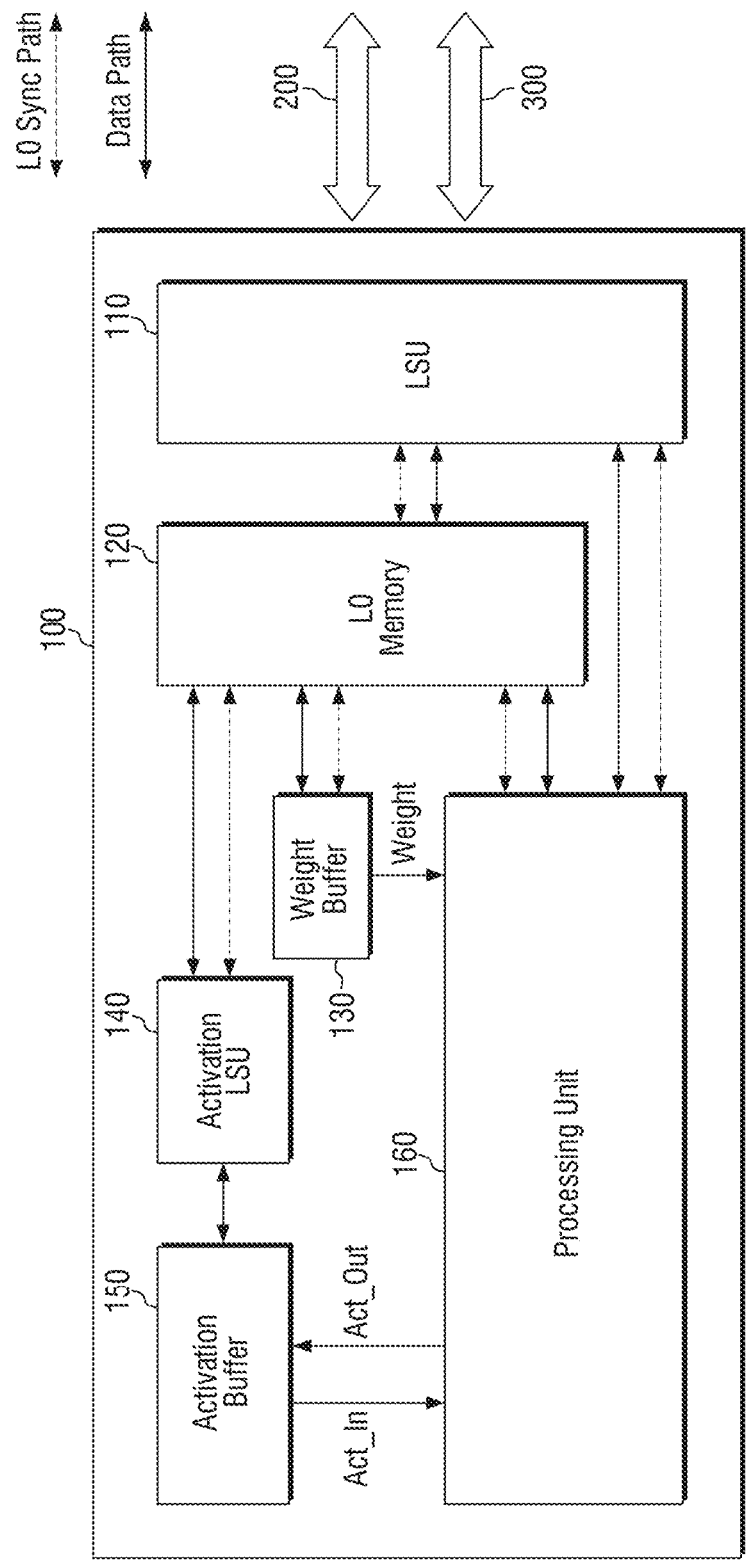
FIG. 8 is a block diagram for illustrating the neural core of FIG. 6 in detail.

FIG. 8 is a block diagram for illustrating the neural core of FIG. 6 in detail.

Referring to FIG. 8, the neural core 100 may include a load/store unit (LSU) 110, an L0 memory 120, a weight buffer 130, an activation LSU 140, an activation buffer 150, and a processing unit 160.

The LSU 110 may receive at least one of data, a control signal, or a synchronization signal from the outside via the local interconnection 200 and the L1 sync path 300. The LSU 110 may transmit at least one of the data, the control signal, or the synchronization signal received to the L0 memory 120. Similarly, the LSU 110 may transfer at least one of the data, the control signal, or the synchronization signal to the outside via the local interconnection 200 and the L1 sync path 300. In this case, the LSU 110 may be referred to as an LSU circuit, but for the sake of convenience, the terms are unified as an LSU. In addition, the LSU 110 may be implemented as a circuit or circuitry.

Specifically, a micro-DMA task may be a task in which the neural core 100 loads a program or data from the shared memory 2000 or the off-chip memory 30 to the L0 memory 120. An LP micro-DMA task may be a load task for a program or data to be used later rather than a current program or data, unlike a general micro-DMA task. Since such a task has a low priority, it can be identified differently from the micro-DMA task. An ST micro-DMA task may be a store task that stores data from the L0 memory 120 of the neural core 100 to the shared memory 2000 or the off-chip memory 30. A pre-processing task may include a task that pre-loads data such as a large number of lookup tables in the CPU 20.

Figure 9:
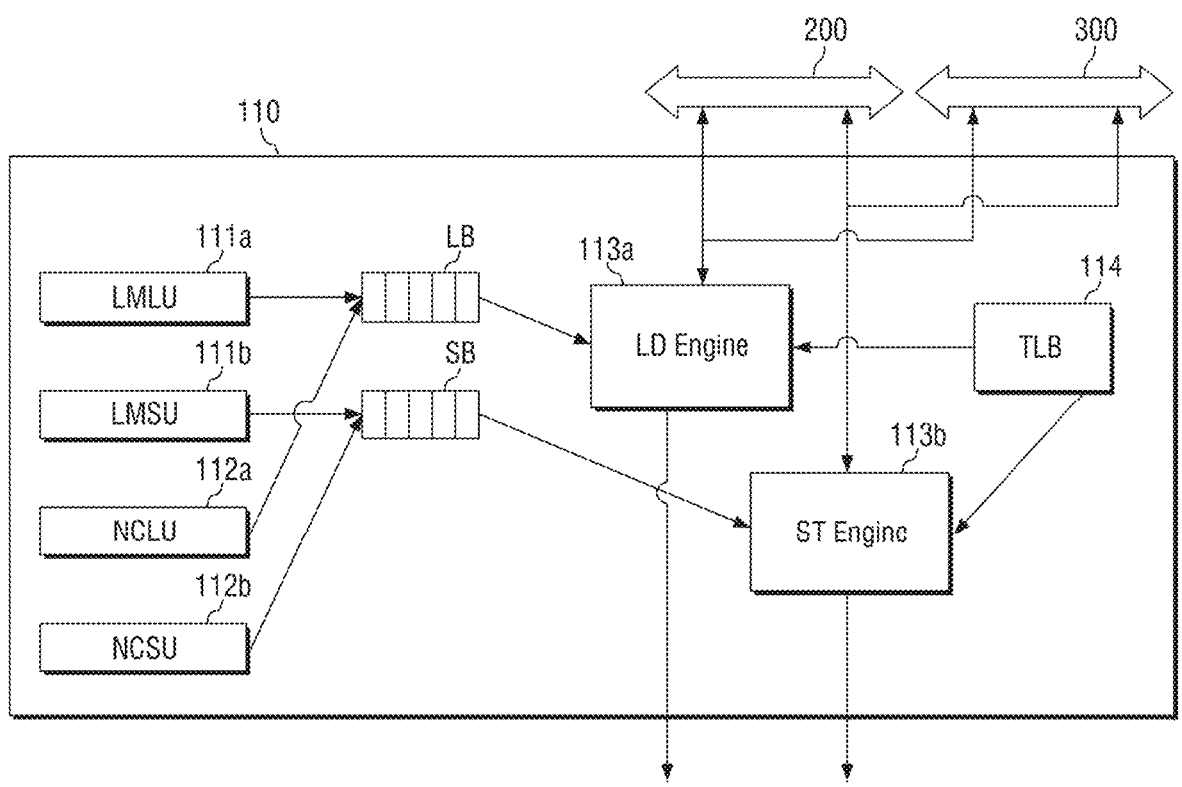
FIG. 9 is a block diagram for illustrating the LSU of FIG. 8 in detail.

FIG. 9 is a block diagram for illustrating the LSU of FIG. 8 in detail.

Referring to FIG. 9, the LSU 110 may include a local memory load unit (LMLU) 111a, a local memory store unit (LMSU) 111b, a neural core load unit (NCLU) 112a, a neural core store unit (NCSU) 112b, a load buffer LB, a store buffer SB, a load (LD) engine 113a, a store (ST) engine 113b, and a translation lookaside buffer (TLB) 114.

The local memory load unit 111a, the local memory store unit 111b, the neural core load unit 112a, the neural core store unit 112b, the load engine 113a, and the store engine 113b may be referred to respectively as a local memory load circuit, a local memory store circuit, a neural core load circuit, a neural core store circuit, a load engine circuit, and a store engine circuit. However, for the sake of convenience, the terms are respectively unified as a local memory load unit, a local memory store unit, a neural core load unit, a neural core store unit, a load engine, and a store engine. In addition, the local memory load unit 111a, the local memory store unit 111b, the neural core load unit 112a, the neural core store unit 112b, the load engine 113a, and the store engine 113b may each be implemented as a circuit or circuitry.

The local memory load unit 111a may fetch a load instruction for the L0 memory 120 and issue the load instruction. When the local memory load unit 111a provides the issued load instruction to the load buffer LB, the load buffer LB may sequentially transmit memory access requests to the load engine 113a according to the inputted order.

Further, the local memory store unit 111b may fetch a store instruction for the L0 memory 120 and issue the store instruction. When the local memory store unit 111b provides the issued store instruction to the store buffer SB, the store buffer SB may sequentially transmit memory access requests to the store engine 113b according to the inputted order.

The neural core load unit 112a may fetch a load instruction for the neural core 100 and issue the load instruction. When the neural core load unit 112a provides the issued load instruction to the load buffer LB, the load buffer LB may sequentially transmit memory access requests to the load engine 113a according to the inputted order.

In addition, the neural core store unit 112b may fetch a store instruction for the neural core 100 and issue the store instruction. When the neural core store unit 112b provides the issued store instruction to the store buffer SB, the store buffer SB may sequentially transmit memory access requests to the store engine 113b according to the inputted order.

The load engine 113a may receive the memory access request and retrieve data via the local interconnection 200. At this time, the load engine 113a may quickly find the data by using a translation table of a virtual address and a physical address that has been used recently in the translation lookaside buffer 114. If the virtual address of the load engine 113a is not in the translation lookaside buffer 114, the address translation information may be found in another memory.

The store engine 113b may receive the memory access request and retrieve data via the local interconnection 200. At this time, the store engine 113b may quickly find the data by using a translation table of a virtual address and a physical address that has been used recently in the translation lookaside buffer 114. If the virtual address of the store engine 113b is not in the translation lookaside buffer 114, the address translation information may be found in another memory.

The load engine 113*a* and the store engine 113*b* may send synchronization signals to the L1 sync path 300. At this time, the synchronization signal may indicate that the task has been completed.

Referring to FIG. 8 again, the L0 memory 120 is a memory located inside the neural core 100, and may receive all input data required for the tasks by the neural core 100 from the outside and store them temporarily. In addition, the L0 memory 120 may temporarily store the output data calculated by the neural core 100 for transmission to the outside.

The L0 memory 120 may transmit an input activation Act_In to the activation buffer 150 and receive an output activation Act_Out via the activation LSU 140. The L0 memory 120 may directly transmit and receive data to and from the processing unit 160, in addition to the activation LSU 140. In other words, the L0 memory 120 may exchange data with each of a processing element (PE) array 163 and a vector unit 164. The L0 memory 120 may be a memory corresponding to the level of the neural core. In this case, the L0 memory 120 may be a private memory of the neural core.

The L0 memory 120 may transmit data such as activations or weights via a data path. The L0 memory 120 may exchange synchronization signals via an L0 sync path, which is a separate dedicated path. The L0 memory 120 may exchange synchronization signals with, for example, the LSU 110, the weight buffer 130, the activation LSU 140, and the processing unit 160 via the L0 sync path.

The weight buffer 130 may receive a weight from the L0 memory 120. The weight buffer 130 may transfer the weight to the processing unit 160. The weight buffer 130 may temporarily store the weight before transferring it.

The input activation Act_In and the output activation Act_Out may refer to input values and output values of the layers of a neural network. In this case, if there are a plurality of layers in the neural network, the output value of the previous layer becomes the input value of the next layer, and thus, the output activation Act_Out of the previous layer may be utilized as the input activation Act_In of the next layer.

The weight may refer to a parameter that is multiplied by the input activation Act_In inputted in each layer. The weight is adjusted and confirmed in the deep learning training phase, and may be used to derive the output activation Act_Out via a fixed value in the inference phase.

The activation LSU 140 may transfer the input activation Act_In from the L0 memory 120 to the activation buffer 150, and the output activation Act_Out from the activation buffer 150 to the on-chip buffer. In other words, the activation LSU 140 may perform both a load task and a store task of the activation.

The activation buffer 150 may provide the input activation Act_In to the processing unit 160 and receive the output activation Act_Out from the processing unit 160. The activation buffer 150 may temporarily store the input activation Act_In and the output activation Act_Out.

The activation buffer 150 may quickly provide the activation to the processing unit 160, in particular, the PE array 163, which has a large quantity of calculations, and may quickly receive the activation, thereby increasing the calculation speed of the neural core 100.

The processing unit 160 may be a module that performs calculations. The processing unit 160 may perform not only one-dimensional calculations but also two-dimensional matrix calculations, i.e., convolution operations. The processing unit 160 may receive an input activation Act_In, multiply it by a weight, and then add it to generate an output activation Act_Out.

Figure 10:
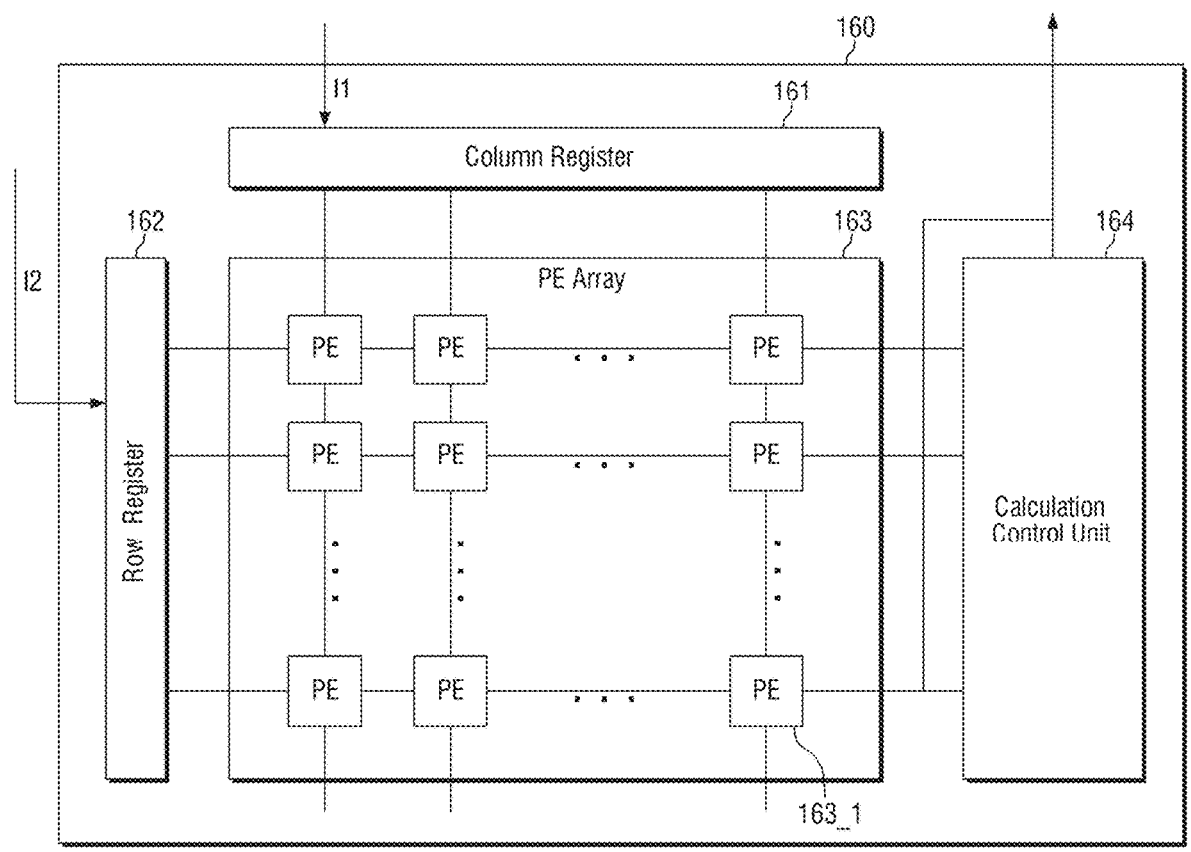
FIG. 10 is a block diagram for illustrating the processing unit of FIG. 8 in detail.

FIG. 10 is a block diagram for illustrating the processing unit of FIG. 8 in detail.

Referring to FIG. 8 and FIG. 10, the processing unit 160 may include a column register 161, and a row register 162, a PE array 163, and a calculation control unit 164.

The column register 161 may receive a first input I1. The column register 161 may receive the first input I1, and distribute them to each column of the processing elements 163_1.

The row register 162 may receive a second input I2. The row register 162 may receive the second input I2, and distribute them to each row of the processing elements 163_1.

The first input I1 may be an input activation Act_In or a weight. The second input I2 may be a value other than the first input I1 between the input activation Act_In or the weight. Alternatively, the first input I1 and the second input I2 may be values other than the input activation Act_In and the weight.

The PE array 163 may receive the input activation Act_In and the weight through the column register 161 and the row register 162. The PE array 163 may perform multiplication of the received input activation Act_In and the received weight. In this case, the input activation Act_In and the weight may be calculated through convolution in the form of matrices. Through this, the PE array 163 may generate the output activation Act_Out. However, the embodiment is not limited thereto. The PE array 163 may also generate any types of outputs other than the output activation Act_Out. The output activation Act_Out may also be referred to as output data generated by and output from the PE array 163.

The PE array 163 may include at least one processing element (PE) 163_1. The processing elements 163_1 may be aligned with each other so that each of the processing elements 163_1 may perform multiplication on one input activation Act_In and one weight. In addition, the PE array 163 may perform various calculations other than the multiplication and convolution described above. For example, calculations that may be performed by the PE array 163 include two-dimensional convolution (conv2d), batch normalization (batchnorm), elementwise, and rectified linear unit (Relu).

In addition, according to some embodiments of the disclosure, the PE array 163 may sum values for each multiplication to generate a subtotal. This subtotal may be utilized as an output activation Act_Out. The PE array 163 performs two-dimensional matrix multiplication, and thus, may be referred to as a 2D matrix compute unit.

In some embodiments of the disclosure, when one-dimensional calculation of the output activation Act_Out is further required, the one-dimensional calculation of the output activation Act_Out may be performed by the L0 memory 120. The L0 memory 120 according to the embodiment of the disclosure may further include a one-dimensional calculation module configured with an adder for performing one-dimensional calculation. The one-dimensional calculation module of the L0 memory 120 may perform deep learning calculation together with the PE array 163 according to task information.

The calculation control unit 164 may check whether one-dimensional calculation of the output activation Act_Out is further required. The calculation control unit 164 may check whether one-dimensional calculation is required for the output activation Act_Out calculated at the current step in response to an instruction provided from the LSU 110. When the one-dimensional calculation of the output activation Act_Out provided from the processing unit 160 is required, the calculation control unit 164 may output the current partial sum value psum for the output activation Act_Out requesting the memory load/store unit MLSU to execute a memory calculation instruction requesting one-dimensional calculation.

The calculation control unit 164 may provide the current partial sum value psum for the output activation Act_Out to the activation buffer 150 requesting to cause the L0 memory 120 to perform the one-dimensional calculation of the current partial sum value psum for the output activation Act_Out. In some embodiments, the memory calculation instruction may include the current partial sum value psum for the output activation Act_Out, an address of target data to perform one-dimensional calculation, and a command to store a result of performing the one-dimensional calculation at the address.

The output activation Act_Out may be transmitted to the L0 memory 120 through the activation buffer 150 and the activation LSU 140. The LSU 110 may import target data from the L0 memory 120 and support performing one-dimensional calculation with the target data imported and the current partial sum value psum for the output activation Act_Out via a one-dimensional calculation module implemented in the L0 memory 120.

In some embodiments, assuming that a k-th layer has $N_k$ nodes and a (k+1)-th layer has $N_{k+1}$ nodes, the processing unit 160 may calculate output activation values $a_{k+1,j}$ (j=1 ... $N_{k+1}$) Act_Out for the (k+1)-th layer based on input activation values $a_{k,i}$ (i=1 ... $N_k$) Act_In for the k-th layer as shown in Equation 1.

$$\begin{bmatrix} a_{k+1,1} \\ a_{k+1,2} \\ \cdots \\ a_{k+1,N_{k+1}} \end{bmatrix} = \begin{bmatrix} w_{k,1,1} & \cdots & w_{k,1,N_k} \\ \vdots & \ddots & \vdots \\ w_{k,N_{k+1},1} & \cdots & w_{k,N_{k+1},N_k} \end{bmatrix} \begin{bmatrix} a_{k,1} \\ a_{k,2} \\ \cdots \\ a_{k,N_k} \end{bmatrix} \quad \text{Equation 1}$$

where $w_{k,j,i}$ represents a weight value applied to an activation value $a_{k,i}$ for the i-th node of the k-th layer to calculate an activation value $a_{k+1,j}$ for the j-th node of the (k+1)-th layer.

In some embodiments, the column register 161 may be for input activation values $a_{k,i}$ (i=1 ... $N_k$) for the k-th layer and the PE array 163 has P×Q processing elements 163_1. In this scenario, when the number $N_k$ of input activation values $a_{k,i}$ for the k-th layer is greater than the number Q of processing elements 163_1 arranged in columns, the output activation value $a_{k+1,j}$ (j=1 ... $N_{k+1}$) for j-th node of the (k+1)-th layer may not be calculated by a single operation of the PE array 163. In some embodiments, the input activation values $a_{k,i}$ (i=1 ... $N_k$) may be grouped to $G_k$ groups, and $G_k$ may be calculated as shown in Equation 2.

$$G_k = \left\lceil \frac{N_k}{Q} \right\rceil \quad \text{Equation 2}$$

The output activation value $a_{k+1,j}$ for j-th node of the (k+1)-th layer may be calculated by accumulating partial sum values $psum_{k,j,r}$ as shown in Equation 3.

$$a_{k+1,j} = \sum_{r=1}^{G_k} psum_{k,j,r} \quad \text{Equation 3}$$

In Equation 3, the r-th partial sum value $psum_{k,j,r}$ for calculating the j-th output activation value $a_{k+1,j}$ may be calculated as shown in Equation 4.

$$psum_{k,j,r} = \sum_{m=1}^{Q} w_{k,j,(r-1)Q+m} \cdot a_{k,(r-1)Q+m} \quad \text{Equation 4}$$

where $w_{k,j,(r-1)Q+m} = 0$, $a_{k,(r-1)Q+m} = 0$ if $(r-1)Q + m > N_k$

The partial sum value $psum_{k,j,r}$ may be accumulated into a previous accumulated partial sum value $aps_{k,j,r-1}$ to acquire a current accumulated partial sum value $aps_{k,j,r}$ as shown in Equation 5.

$$aps_{k,j,r} = aps_{k,j,r-1} + psum_{k,j,r} (r = 1 ... G_k) \quad \text{Equation 5}$$

where $aps_{k,j,0} = 0$

The last accumulated partial sum value generated by accumulating all partial sum values may become the output activation value $a_{k+1,j}$ as shown in Equation 6.

$$a_{k+1,j} = aps_{k,j,G_k} \quad \text{Equation 6}$$

Hereinafter, a configuration of the L0 memory and a process of performing one-dimensional calculation by the L0 memory are described in more detail with reference to FIGS. 11A, 11B, 12 to 14.

Figure 11A:
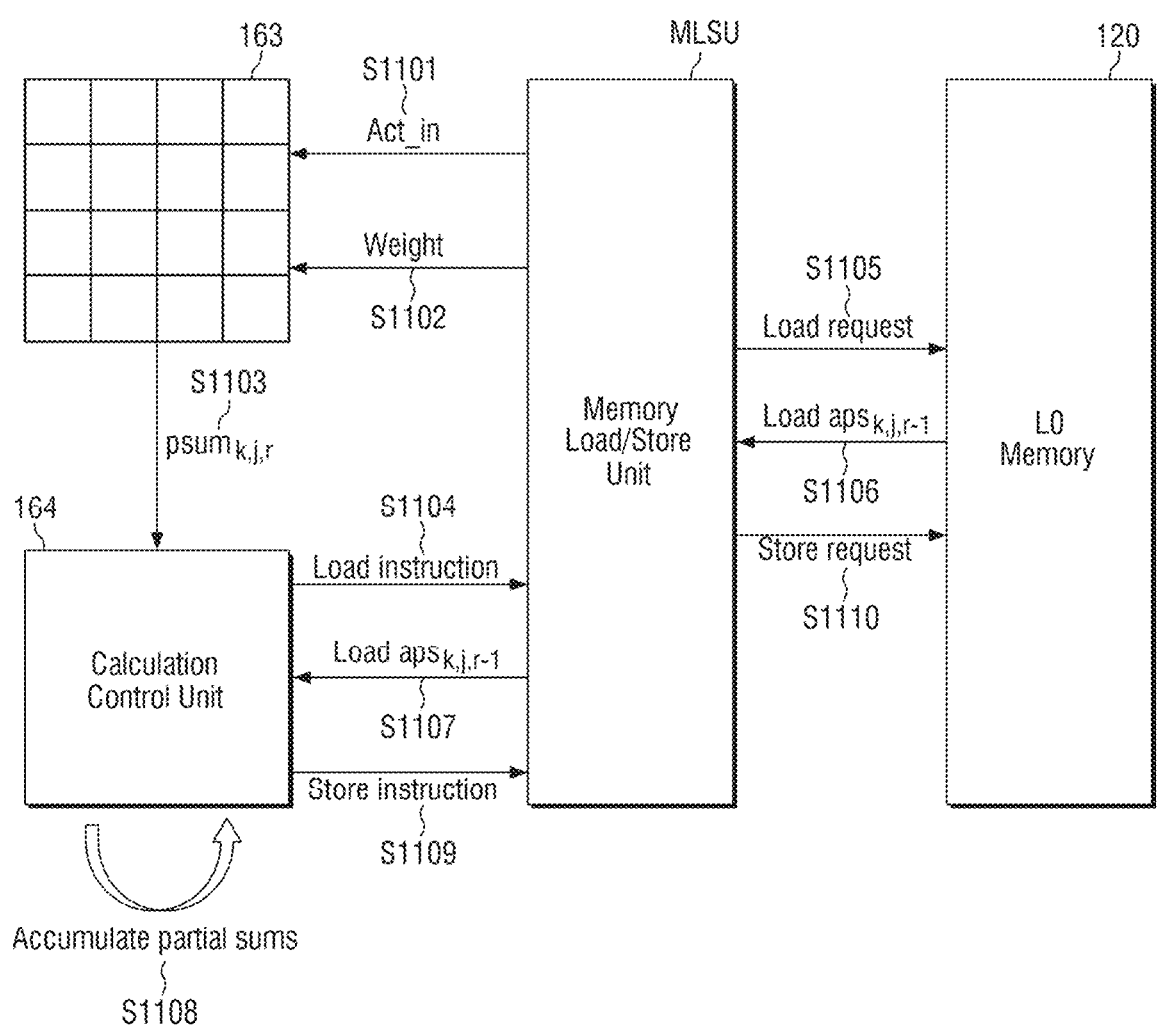
FIG. 11A is an example diagram for illustrating a process of storing an accumulated partial sum value in the L0 memory.

FIG. 11A is an example diagram for illustrating a process of storing an accumulated partial sum value in the L0 memory.

Referring to FIG. 11A, the LSU 110, the weight buffer 130, the activation LSU 140, and the activation buffer 150 of FIG. 8 may be defined as a memory load/store unit MLSU that manages storage and loading of data to the L0 memory 120. In this case, the memory load/store unit MLSU may be referred to as a memory load/store unit circuit, but for the sake of convenience, the terms are unified as the memory load/store unit. Also, the memory load/store unit MLSU may be implemented as a circuit or circuitry.

The memory load/store unit MLSU may receive a task generated by the task manager 600 through the core global 500 and may support calculation according to information or a descriptor of the task to be performed by the processing unit 160 and the L0 memory 120.

The PE array 163 may receive input activation values $a_{k,i}$ (i=1 ... $N_k$) Act_in at S1101 and weights $w_{k,j,i}$ (j=1 ... $N_{k+1}$, i=1 ... $N_k$) for the k-th layer of a neural network model at S1102.

The PE array 163 may perform two-dimensional calculation corresponding to a weighted-sum of the input activation values Act_in with the weights to generate the r-th partial sum value $psum_{k,j,r}$ for calculating the j-th output activation value $a_{k+1,j}$ for the neural network model at S1103. The r-th partial sum value $psum_{k,j,r}$ may be referred to as a current partial sum value.

The calculation control unit 164 may generate a load instruction to load a (r−1)-th accumulated partial sum value $aps_{k,j,r-1}$ in a memory cell of the L0 memory 120 referenced by a memory address and send the load instruction to the memory LSU MLSU at S1104. The (r−1)-th accumulated partial sum value $aps_{k,j,r-1}$ in a memory cell of the L0 memory 120 referenced by a memory address may be referred to as target data. In some embodiments, the calculation control unit 164 may send a load request requesting the memory LSU MLSU to execute the load instruction.

The memory LSU MLSU may execute the load instruction to generate a load request requesting the L0 memory 120 to load the (r−1)-th accumulated partial sum value $aps_{k,j,r-1}$ in the memory cell of the L0 memory 120 referenced by the memory address indicated by the load instruction and send the load request to the L0 memory 120 at S1105.

The L0 memory 120 may load the (r−1)-th accumulated partial sum value $aps_{k,j,r-1}$ from the memory cell referenced by the memory address indicated by the load request and send the (r−1)-th accumulated partial sum value $aps_{k,j,r-1}$ to the memory LSU MLSU at S1106.

The memory LSU MLSU may send the (r−1)-th accumulated partial sum value $aps_{k,j,r-1}$ to the calculation control unit 164 at S1107.

At S1108, the calculation control unit 164 may accumulate the r-th partial sum value $psum_{k,j,r}$ and the (r−1)-th accumulated partial sum value $aps_{k,j,r-1}$ to generate an r-th accumulated partial sum value $aps_{k,j,r}$ as shown in Equation 5.

The calculation control unit 164 may generate a store instruction to store the r-th accumulated partial sum value $aps_{k,j,r}$ in the memory cell of the L0 memory 120 referenced by the memory address and send the store instruction to the memory LSU MLSU at S1109. In some embodiments, the calculation control unit 164 may send the r-th accumulated partial sum value $aps_{k,j,r}$ requesting the memory LSU MLSU to execute the store instruction.

The memory LSU MLSU may execute the store instruction to generate a store request requesting the L0 Memory 120 to store the r-th accumulated partial sum value $aps_{k,j,r}$ in the memory cell of the L0 memory 120 referenced by the memory address indicated by the store instruction and send the store request to the L0 memory 120 so that the L0 memory 120 may store the r-th accumulated partial sum value $aps_{k,j,r}$ in the memory cell referenced by the memory address indicated by the store request at S1110.

According to the embodiment as shown in FIG. 11A, since the memory LSU MLSU needs to perform eight operations S1101, S1102, S1104, S1105, S1106, S1107, S1109, and S1110, a lot of loads may be concentrated to the memory LSU MLSU whenever accumulating a partial sum value, which may reduce processing efficiency and computation speed and increase power consumption.

Figure 11B:
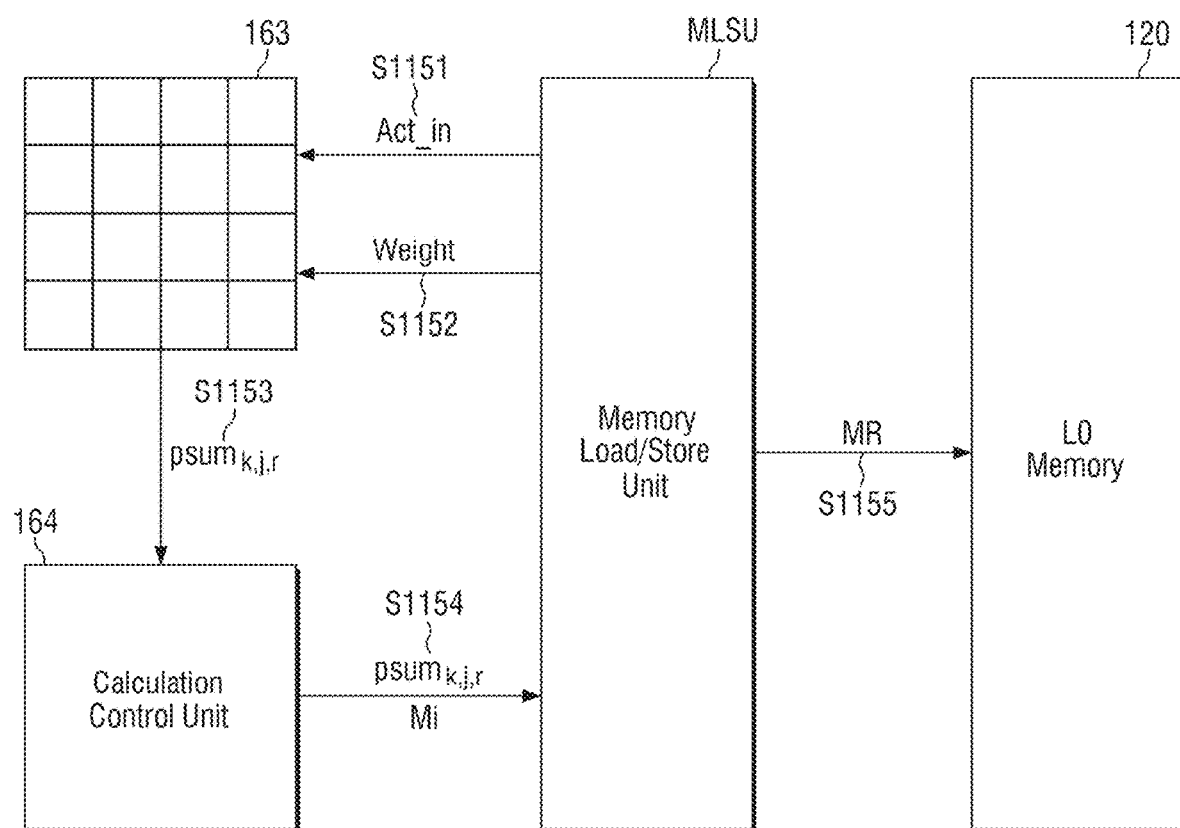
FIG. 11B is an example diagram for illustrating a process of storing an accumulated partial sum value in the L0 memory.

FIG. 11B is another example diagram for illustrating a process of storing an accumulated partial sum value in the L0 memory.

Referring to FIG. 11B, the LSU 110, the weight buffer 130, the activation LSU 140, and the activation buffer 150 of FIG. 8 may be collectively referred to as a memory load/store unit MLSU that manages storage and loading of data to the L0 memory 120. In this case, the memory load/store unit MLSU may be referred to as a memory load/store unit circuit, but for the sake of convenience, the terms are unified as the memory load/store unit. Also, the memory load/store unit MLSU may be implemented as a circuit or circuitry.

The memory load/store unit MLSU may receive a task generated by the task manager 600 through the core global 500 and may support calculation according to information or a descriptor of the task to be performed by the processing unit 160 and the L0 memory 120.

The PE array 163 may receive input activation values $a_{k,i}$ (i=1 . . . $N_k$) Act_in at S1151 and weights $w_{k,j,i}$ (j=1 . . . $N_k$+1, i=1 . . . $N_k$) for the k-th layer of a neural network model at S1152.

The PE array 163 may perform two-dimensional calculation corresponding to a weighted-sum of the input activation values Act_in with the weights to generate the r-th partial sum value $psum_{k,j,r}$ for calculating the j-th output activation value $a_{k+1,j}$ for the neural network model at S1153.

The calculation control unit 164 may send the r-th partial sum value $psum_{k,j,r}$ requesting the memory LSU MLSU to execute a memory calculation instruction MI. The memory calculation instruction MI may send a memory calculation request MR requesting the L0 memory 120 to add the r-th partial sum value $psum_{k,j,r}$ with a (r−1)-th accumulated partial sum value $aps_{k,j,r-1}$ in a memory cell of the L0 memory 120 referenced by a memory address at S1154. For convenience, the memory calculation instruction MI may be referred to as a floating point Add & Store instruction or an Add & Store instruction. In some embodiments, the calculation control unit 164 may check whether one-dimensional calculation corresponding to the add operation is required for the output activation Act_Out. For example, if the PE array 163 generate the first partial sum value $psum_{k,j,1}$, the add operation may not be required; otherwise, the add operation may be required. When the one-dimensional calculation corresponding to add operation is further required, the memory calculation instruction MI requesting both the one-dimensional calculation and store operation may be executed. When the one-dimensional calculation of the output activation Act_Out is not further required, the calculation control unit 164 may generate and send a request requesting the memory LSU MLSU to execute the memory calculation instruction MI requesting the store operation.

In response to receiving the r-th partial sum value $psum_{k,j,r}$, the memory LSU MLSU may execute the memory calculation instruction MI to generate a memory calculation request MR requesting the L0 memory 120 to add the r-th partial sum value $psum_{k,j,r}$ with the (r−1)-th accumulated partial sum value $aps_{k,j,r-1}$ in the memory cell of the L0 memory 120 referenced by the memory address indicated by the load instruction and send the memory calculation request MR to the L0 memory 120 at S1155. For convenience, the memory calculation request MR may be referred to as an Add & Store request.

The L0 memory 120 may accumulate the r-th partial sum value $psum_{k,j,r}$ with the (r−1)-th accumulated partial sum value $aps_{k,j,r-1}$ in the memory cell referenced by the memory address indicated by the memory calculation request MR to generate an r-th accumulated partial sum value $aps_{k,j,r}$ as shown in Equation 5 and store the r-th accumulated partial sum value $aps_{k,j,r}$ in the memory cell referenced by the memory address indicated by the memory calculation request MR at S1156.

As shown in FIG. 11B, since the memory LSU MLSU performs four operations S1151, S1152, S1154, and S1155 for accumulating a partial sum value, loads may be distributed between the memory LSU MLSU and L0 memory 120, which may increase processing efficiency and computation speed and reduce power consumption.

Figure 12:
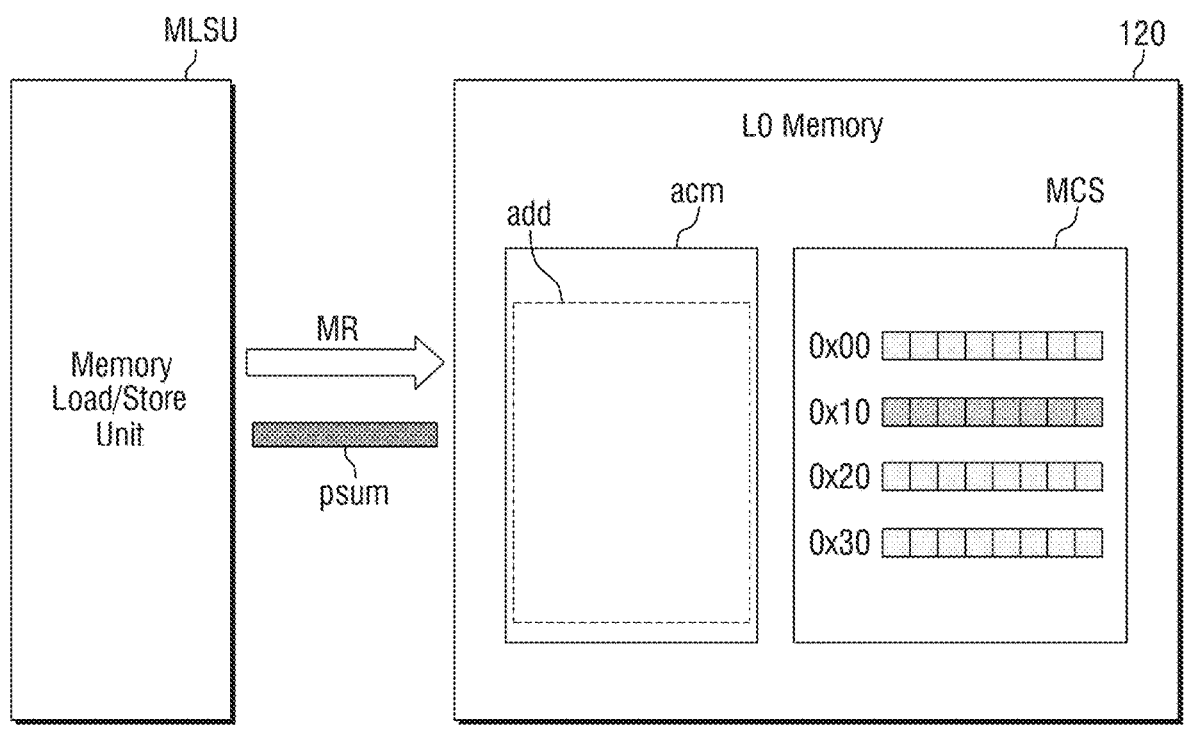
FIGS. 12 to 14 are example diagrams for illustrating a process in which one-dimensional calculation is performed by an L0 memory in response to a memory calculation request.
Figure 13:
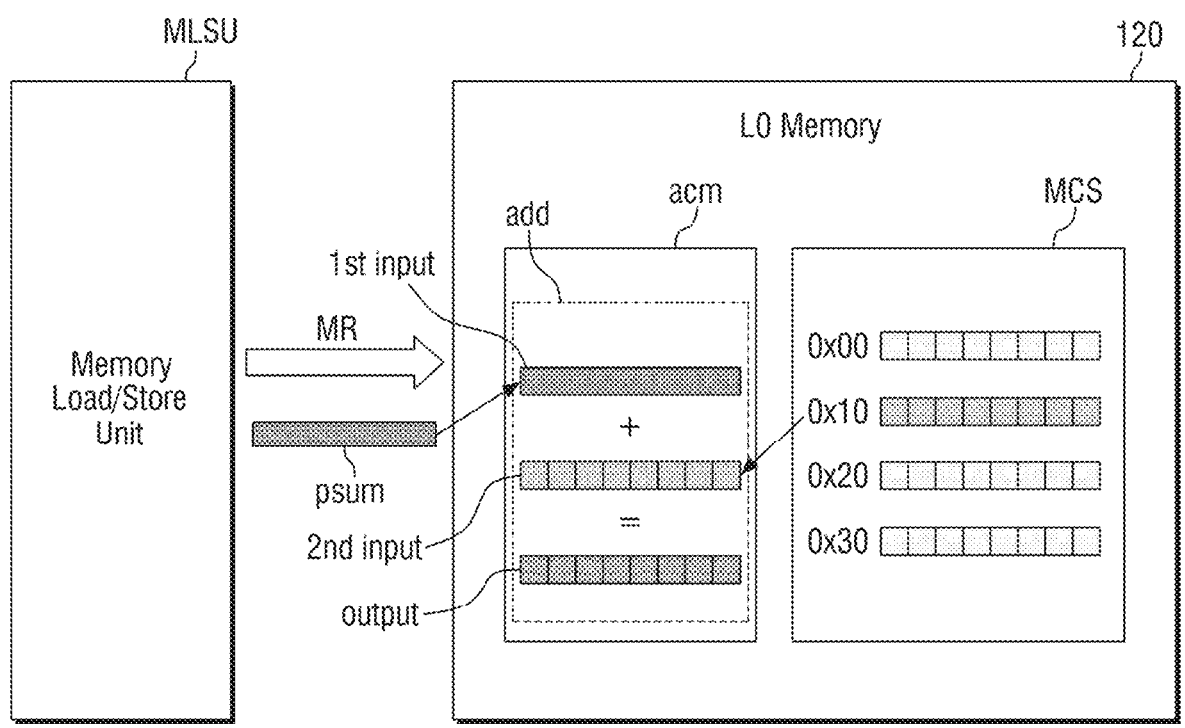
Figure 14:
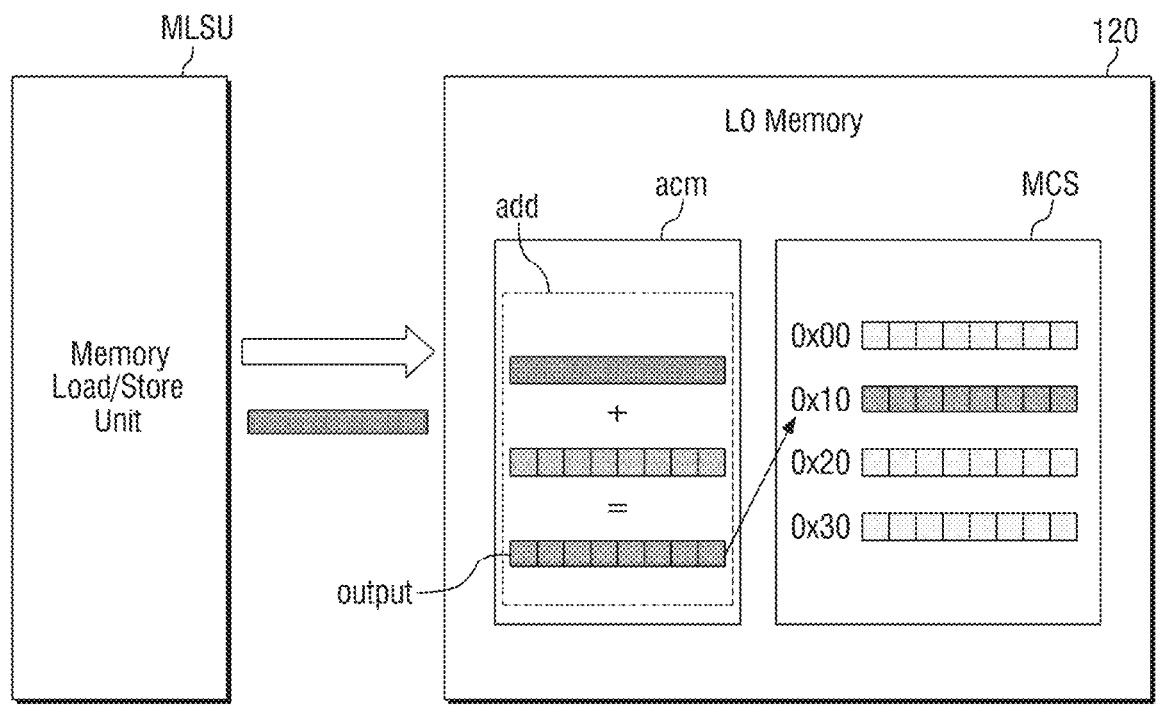

FIGS. 12 to 14 are example diagrams for illustrating a process in which one-dimensional calculation is performed by the L0 memory 120 in response to a memory calculation request.

Referring to FIG. 12, the L0 memory 120 may include an adder calculation module acm. The adder calculation module acm may include an adder add. The adder calculation module acm may be a logic circuit that sums the current partial sum value psum for the output activation Act_Out and target data and outputs the summed value. In other words, the adder calculation module acm may be a one-dimensional calculation module that performs one-dimensional calculations, but is not limited thereto.

Also, the L0 memory 120 may include at least one memory cell MCS. Each memory cell MCS may be a space in which data is stored and may have a distinct address. The memory load/store unit MLSU may provide the current partial sum value psum for the output activation Act_Out to the adder calculation module acm. In addition, the memory load/store unit MLSU may execute the memory calculation instruction MI to generate a memory calculation request MR requesting to import the target data stored in the address and to input the target data to the adder calculation module acm. The memory load/store unit MLSU may transmit the generated memory calculation request MR to the L0 memory 120. In the example of FIG. 12, an address included in the memory calculation request MR may be "0x10", and target data corresponding to 0x10 may be imported and inputted to the adder calculation module acm in response to the memory calculation request MR.

Referring to FIG. 13, the current partial sum value psum for the output activation Act_Out is provided as a first input value 1st input of the adder calculation module acm. In addition, the target data is imported from the corresponding address in response to the memory calculation request MR and provided as a second input value 2nd input of the adder calculation module acm. The adder calculation module acm may calculate an output value output by summing the first input value 1st input and the second input value 2nd input.

The memory calculation request MR may include storing an output value output from the adder calculation module acm in an address where the target data was stored before calculation.

Referring to FIG. 14, it can be seen that an output value output is stored in the address "0x10" where the target data is previously stored.

As described above, in the neural core 100 according to some embodiments of the disclosure, the two-dimensional matrix multiplication may be performed by the processing device 160, and the one-dimensional calculation corresponding to simple summation may be performed by the L0 memory 120. That is, unlike the conventional neural core in which a vector unit for one-dimensional calculation is provided in the processing unit 160, there is no need to import functions for one-dimensional calculation into the vector unit, and power and energy consumption for importing functions and data may be saved.

In addition, in the neural core 100 according to some embodiments of the disclosure, two-dimensional calculation and one-dimensional calculation are respectively performed by the processing unit 160 and the L0 memory 120, and thus, it is possible to ameliorate problems of the known structure that reduces efficiency and balancing of data processing because the processing unit 160 performs together two-dimensional convolution and one-dimensional calculation, and in some cases, performs one-dimensional calculation more.

Figure 15:
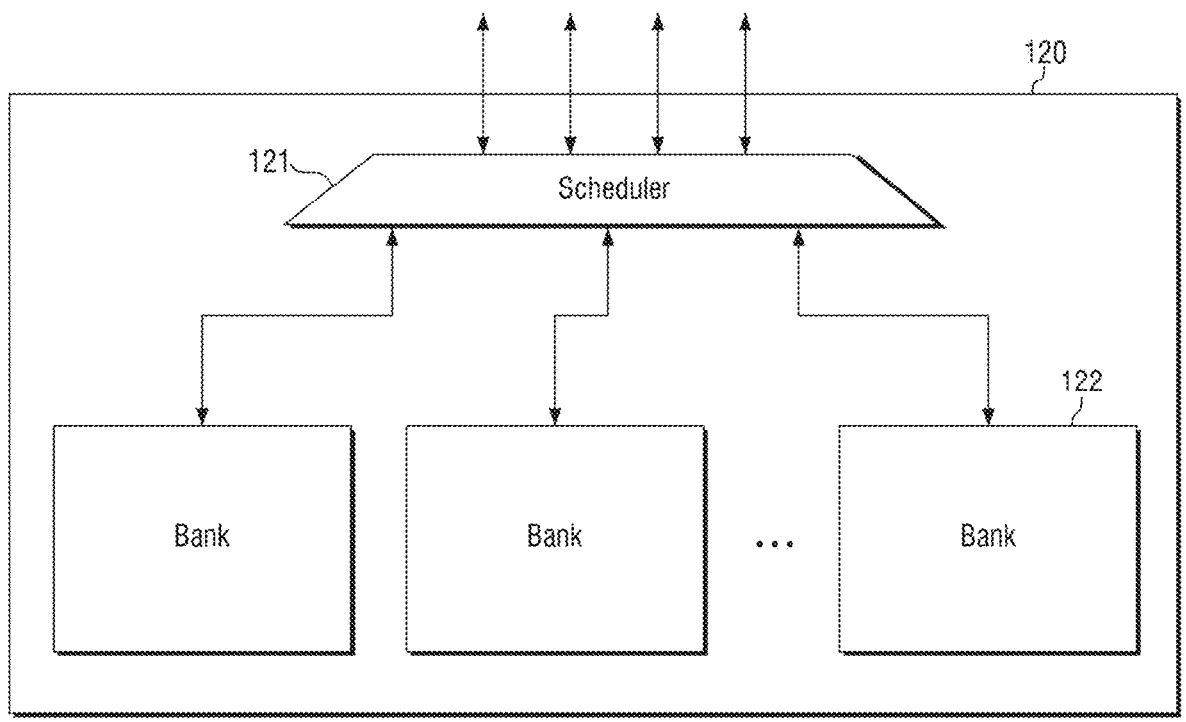
FIG. 15 is a block diagram for illustrating the L0 memory of FIG. 8 in detail.

FIG. 15 is a block diagram for illustrating the L0 memory of FIG. 8 in detail.

Referring to FIG. 15, the L0 memory 120 may include a scheduler 121 and one or more local memory banks 122.

When data is stored in the L0 memory 120, the scheduler 121 may receive data from the load engine 113*a*. In this case, the local memory bank 122 may be allocated for the data in a round-robin manner. Accordingly, data may be stored in any one of the local memory banks 122.

In contrast to this, when data is loaded from the L0 memory 120, the scheduler 121 may receive the data from the local memory bank 122 and transmit the data to the store engine 113*b*. The store engine 113*b* may store the data in the outside through the local interconnection 200. In this case, the scheduler 121 may be referred to as a scheduler circuit, but for the sake of convenience, the terms are unified as a scheduler. In addition, the scheduler 121 may be implemented as a circuit or circuitry.

In some embodiments, each of one or more local memory banks 122 may include the adder calculation module acm.

Figure 16:
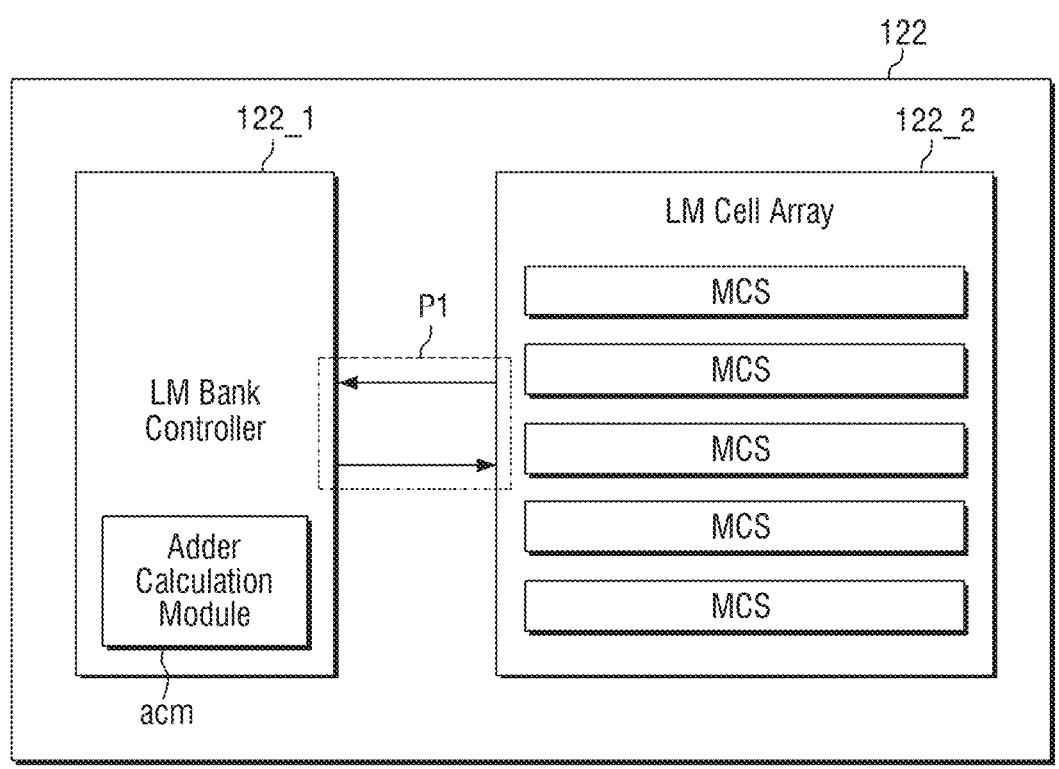
FIG. 16 is a block diagram for illustrating a local memory bank of FIG. 15 according to some embodiments in detail.

FIG. 16 is a block diagram for illustrating the local memory bank of FIG. 15 according to some embodiments in detail.

Referring to FIG. 16, the local memory bank 122 may include a local memory bank controller 122_1, a local memory bank cell array 122_2, an adder calculation module acm, and a first port P1.

The local memory bank controller 122_1 may manage read and write operations through addresses of data stored in the local memory bank 122. That is, the local memory bank controller 122_1 may manage input and output of data as a whole.

The local memory bank cell array 122_2 may have a structure in which memory cells MCS for directly storing data are aligned. In an exemplary embodiment, the local memory bank cell array 122_2 may have a structure in which the memory cells MCS are aligned in rows and columns, but is not limited thereto. The local memory bank cell array 122_2 may be controlled by the local memory bank controller 122_1.

The first port P1 may be a path through which data is exchanged between the local memory bank controller 122_1 and the local memory bank cell array 122_2. The first port P1 may include a channel for receiving data and a channel for transmitting data based on the local memory bank controller 122_1.

In this case, as illustrated in FIG. 16, the adder calculation module acm may be included in the local memory bank controller 122_1. The adder calculation module acm may generate the current accumulated partial sum value $aps_{k,j,r}$ by performing one-dimensional calculation between target data imported from the memory cell MCS and the current partial sum value psum for the output activation Act_Out which is inputted. The adder calculation module acm may import the target data from a preset address of the memory cells MCS by using the first port P1 and store the current accumulated partial sum value $aps_{k,j,r}$ in the preset address of the memory cells MCS.

Such port may be configured as a single port as illustrated in FIG. 16, but the embodiment of the disclosure is not limited thereto. In some embodiments, the port may be configured as a dual port.

Figure 17:
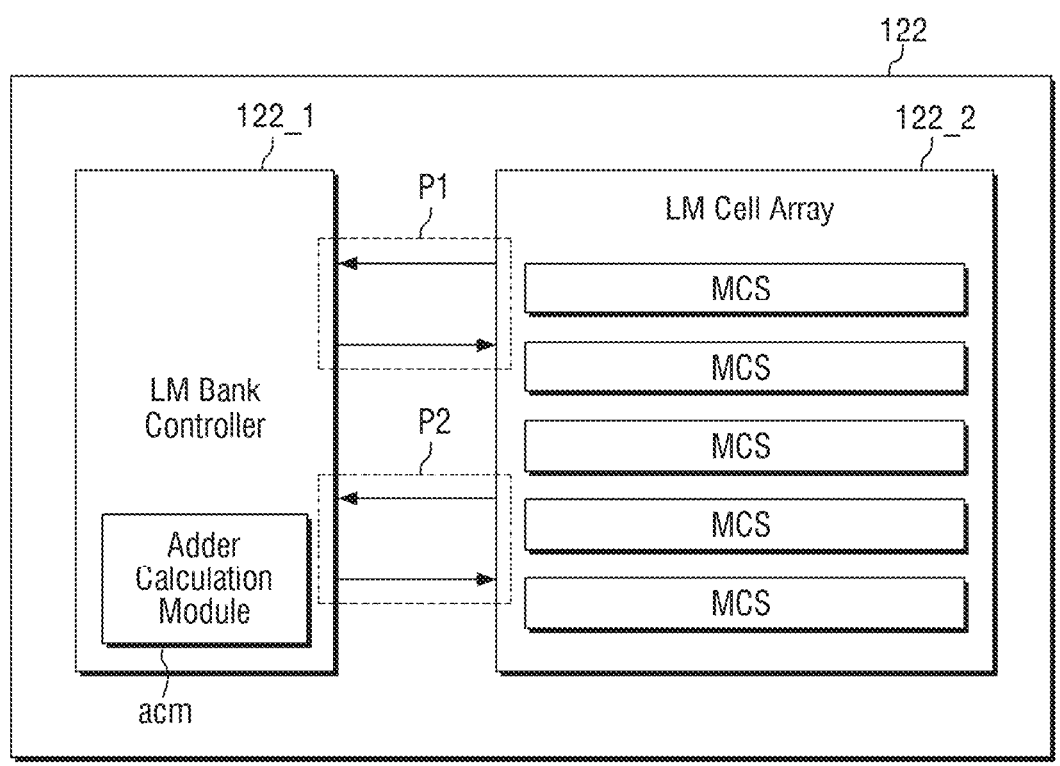
FIG. 17 is a block diagram for illustrating a local memory bank configured in a dual port structure in detail.

FIG. 17 is a block diagram for illustrating a local memory bank configured in a dual port structure.

Referring to FIG. 17, the local memory bank 122 may include a local memory bank controller 122_1, a local memory bank cell array 122_2, an adder calculation module acm, a first port P1, and a second port P2.

In the example of FIG. 17, the local memory bank controller 122_1 and the local memory bank cell array 122_2 may exchange data through the first port P1 and the second port P2. That is, in the embodiment, a port connecting the local memory bank controller 122_1 to the local memory bank cell array 122_2 may have a dual port structure including the first port P1 and the second port P2. Accordingly, even in a situation where the adder calculation module acm occupies the first port P1 and exchanges data, the local memory bank controller 122_1 may exchange data with the local memory bank cell array 122_2 through the second port P2.

Also, in some embodiments, the adder calculation module acm may be included in the local memory bank cell array 122_2.

Figure 18:
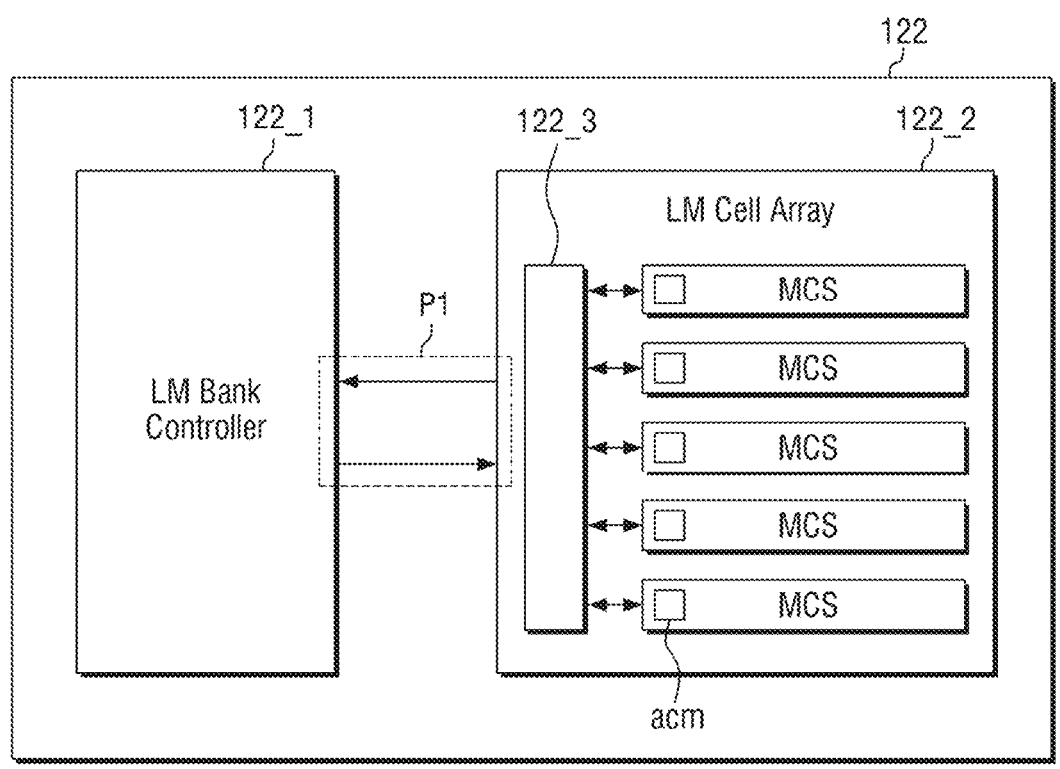
FIG. 18 is an example diagram for illustrating adder calculation modules respectively arranged in memory cells of a local memory bank cell array.
Figure 19:
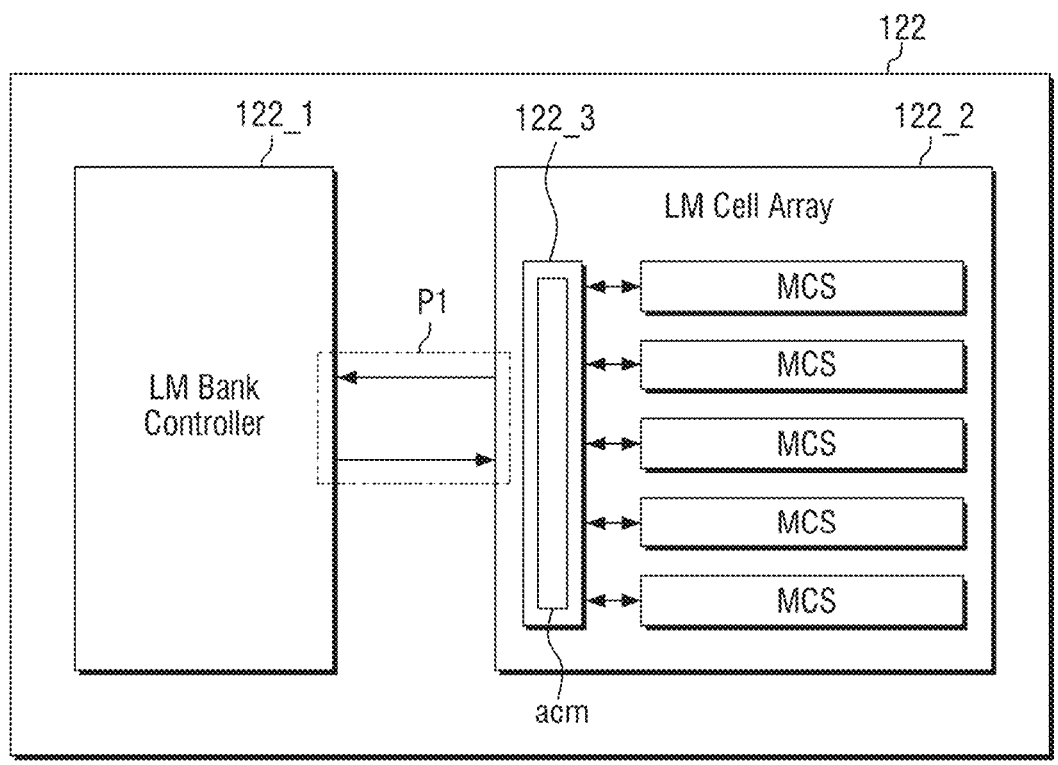
FIG. 19 is an example diagram for illustrating an adder calculation module arranged in a memory cell controller of a local memory bank cell array.

FIG. 18 is an example diagram for illustrating adder calculation modules respectively arranged in memory cells of a local memory bank cell array. FIG. 19 is an example diagram for illustrating an adder calculation module acm arranged in a memory cell controller of a local memory bank cell array.

As illustrated in FIG. 18, each of the memory cells MCS may include the adder calculation modules acm.

The local memory bank cell array 122_2 may include the memory cell controller 122_3 that controls the plurality of memory cells MCS. As illustrated in FIG. 19, the adder calculation module acm may be included in the memory cell controller 122_3.

In FIGS. 18 and 19, data imports and data calculations performed by the adder calculation module acm may be performed in the local memory bank cell array 122_2. Accordingly, a movement distance of data may be further reduced compared to the known structure, and energy reduction and data processing efficiency may be further improved.

Figure 20:
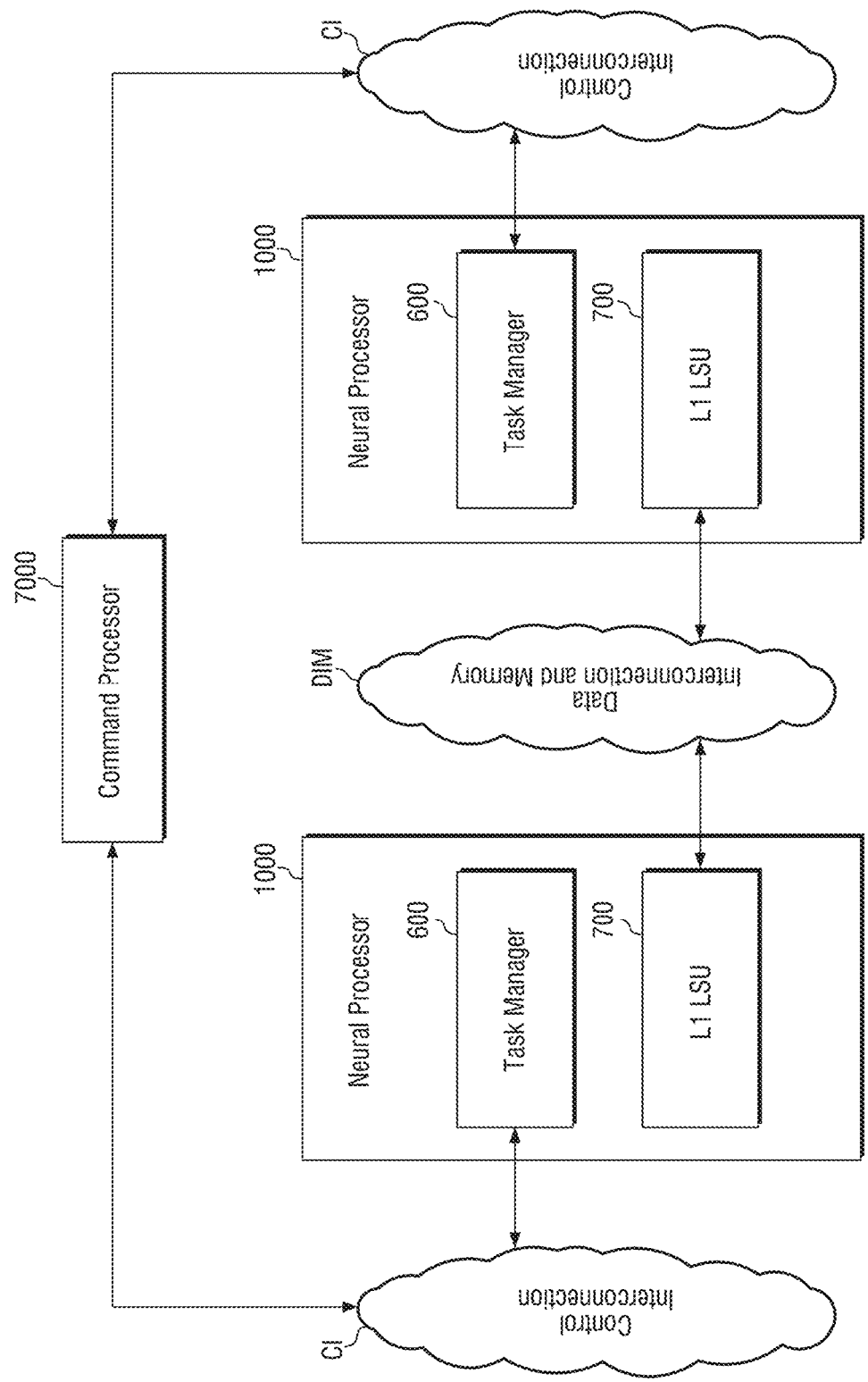
FIG. 20 is a block diagram for illustrating a flow of data and control signals of the neural processing device of FIG. 1.
Figure 21:
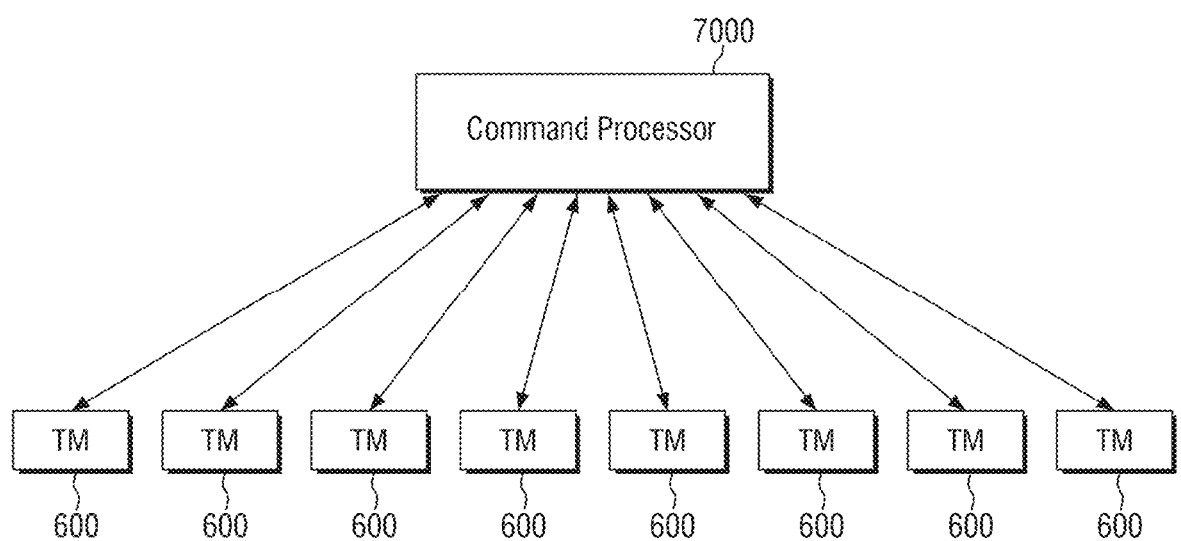
FIG. 21 is a block diagram for illustrating relationship between the command processor and the task managers of FIG. 20.

FIG. 20 is a block diagram for illustrating a flow of data and control signals of the neural processing device of FIG. 1. FIG. 21 is a block diagram for illustrating relationship between the command processor and the task managers of FIG. 20;

Referring to FIGS. 20 and 21, the neural processor 1000 may include at least one neural core 100. Each neural processor 1000 may include a task manager 600 and an L1 LSU 700 therein, respectively. The task managers 600 may exchange control signals and responses to the control signals with a command processor 7000 via a control interconnection CI.

In contrast, the L1 LSU 700 may exchange data via a data interconnection and memory DIM. The data interconnection and memory DIM may include an interconnection for transmitting data and a memory in which data are shared. Specifically, the data interconnection and memory DIM may include a local interconnection 200 and a data channel 6100. In addition, the data interconnection and memory DIM may include an L1 shared memory 400, a shared memory 2000, and a volatile memory 32. However, the embodiment is not limited thereto.

The task managers 600 may be controlled by the command processor 7000. That is, the command processor 7000 may transfer tasks to the task managers 600 via control signals, and the task managers 600 may transfer task completion reports to the command processor 7000. At least one task manager 600 may be included in the neural processor 1000. Moreover, if the neural processors 1000 are plural, the number of task managers 600 may get larger. Such a plurality of task managers 600 may all be controlled by the command processor 7000.

Figure 22:
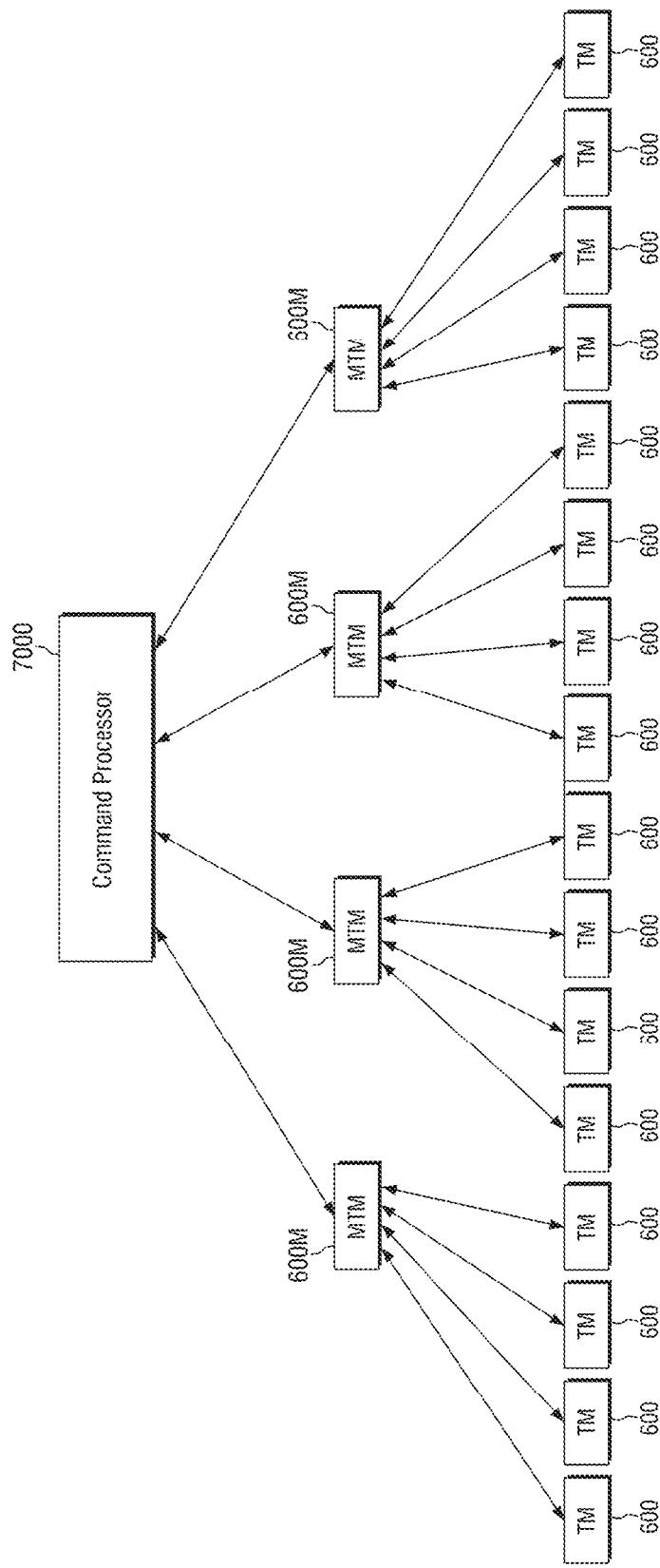
FIG. 22 is a diagram for illustrating a hierarchical structure of a command processor and task managers of a neural processing device in accordance with some embodiments of the disclosure.
Figure 23:
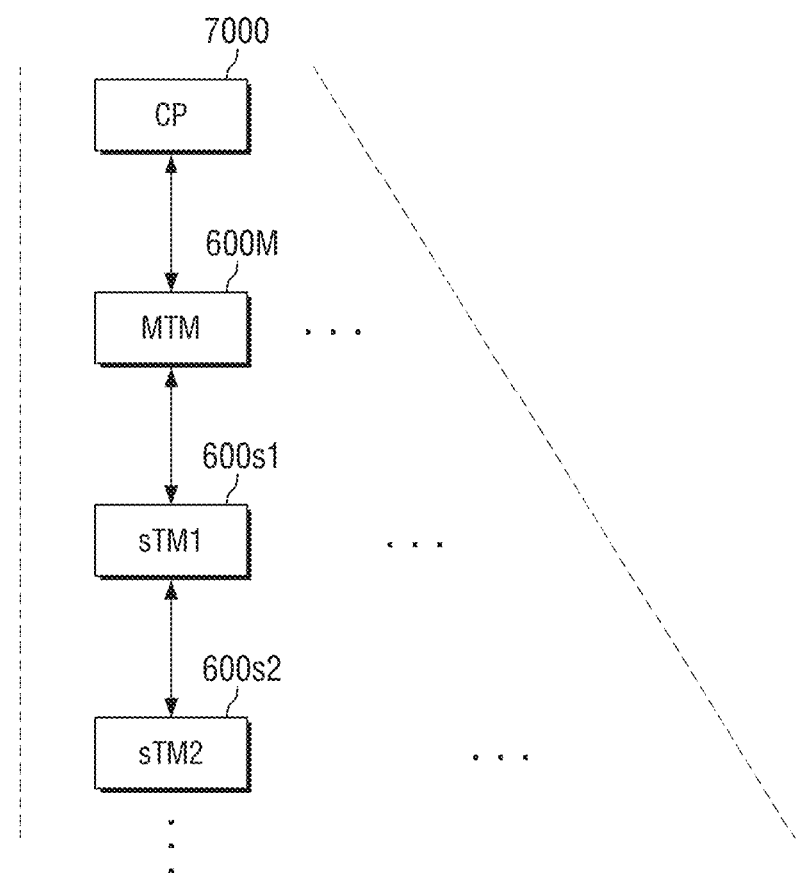
FIG. 23 is a diagram for illustrating a hierarchical structure of a command processor and task managers of a neural processing device in accordance with some embodiments of the disclosure.

FIG. 22 is a diagram for illustrating a hierarchical structure of a command processor and task managers of a neural processing device in accordance with some embodiments of the disclosure. FIG. 23 is a diagram for illustrating a hierarchical structure of a command processor and task managers of a neural processing device in accordance with some embodiments of the disclosure.

Referring to FIG. 22, if a number of task managers 600 increases, it may be difficult for the command processor 7000 to manage all of the task managers 600. Therefore, the neural processing device 1 in accordance with some embodiments of the disclosure may have a hierarchical structure in which each of master task managers 600M manages the plurality of task managers 600 and the command processor 7000 manages the master task managers 600M.

Further, referring to FIG. 23, levels below one of the master task manager 600M may also be subdivided into a plurality. For example, a first sub-task manager 600s1 and a second sub-task manager 600s2 may form each layer. That is, one first sub-task manager 600s1 may manage at least one second sub-task manager 600s2, and one master task manager 600M may manage at least one first sub-task manager 600s1. Additionally, several layers may be added below the second sub-task manager 600s2 as well.

That is, although three levels of the task manager 600, the master task manager 600M, and the command processor 7000 are shown in FIGS. 22 and 23, the number of levels may be four or more. In other words, the depth of the hierarchical structure may vary as desired depending on the number of task managers 600.

Figure 24:
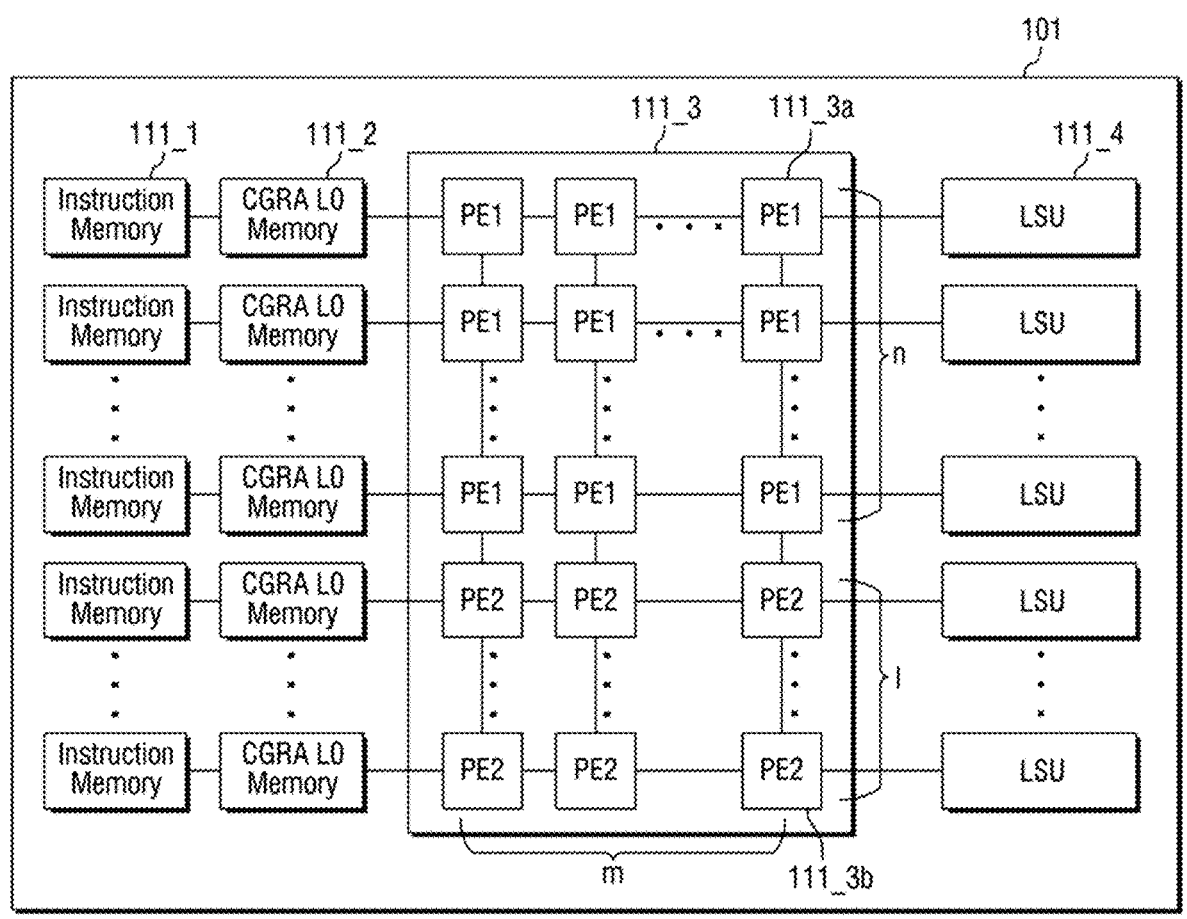
FIG. 24 is a block diagram for illustrating the structure of the neural processing device in accordance with some embodiments of the disclosure in detail.

FIG. 24 is a block diagram for illustrating the structure of the neural processing device in accordance with some embodiments of the disclosure in detail.

Referring to FIG. 24, a neural core 101 may have a CGRA structure, unlike a neural core 100. The neural core 101 may include an instruction memory 111_1, a CGRA L0 memory 111_2, a PE array 111_3, and a load/store unit (LSU) 111_4. The PE array 111_3 may include a plurality of processing elements interconnected by a mesh style network. The mesh style network may be two-dimensional, three-dimensional, or higher-dimensional. In the CGRA, the plurality of processing elements may be reconfigurable or programmable. The interconnection between the plurality of processing elements may be reconfigurable or programmable. In some embodiments, the interconnection between the plurality of processing elements may be statically reconfigurable or programmable when the interconnection is fixed after the plurality of processing elements are configured or programed. In some embodiments, the interconnection between the plurality of processing elements may be dynamically reconfigurable or programmable when the interconnection is reconfigurable or programmable even after the plurality of processing elements are configured or programed.

The instruction memory 111_1 may receive and store instructions. The instruction memory 111_1 may sequentially store instructions internally, and provide the stored instructions to the PE array 111_3. In this case, the instructions may instruct the operation of first type of a plurality of processing elements 111_3a included in each PE array 111_3.

The CGRA L0 memory 111_2 may be located inside the neural core 101, receive all input data required for tasks of the neural core 101, and temporarily store the data. In addition, the CGRA L0 memory 111_2 may temporarily store output data calculated by the neural core 101 to transmit the data to the outside. The CGRA L0 memory 111_2 may serve as a cache memory of the neural core 101.

The CGRA L0 memory 111_2 may send and receive data to and from the PE array 111_3. The CGRA L0 memory 111_2 may be a memory corresponding to L0 (level 0) that is lower than L1. In this case, the L0 memory may be a private memory of the neural core 101 that is not shared. The CGRA L0 memory 111_2 may transmit data such as activations or weights, programs, and the like to the PE array 111_3.

The PE array 111_3 may be a module that performs calculations. The PE array 111_3 may perform not only one-dimensional calculations but also two-dimensional or higher matrix/tensor calculations. The PE array 111_3 may include the first type of the plurality of processing elements 111_3a and a second type of a plurality of processing elements 111_3b therein.

The first type of the plurality of processing elements 111_3a and the second type of the plurality of processing elements 111_3b may be arranged in rows and columns. The first type of the plurality of processing elements 111_3a and the second type of the plurality of processing elements 111_3b may be arranged in m columns. In addition, the first type of the plurality of processing elements 111_3a may be arranged in n rows, and the second type of the plurality of processing elements 111_3b may be arranged in 1 rows. Accordingly, the first type of the plurality of processing elements 111_3a and the second type of the plurality of processing element 111_3b may be arranged in (n+1) rows and m columns.

The LSU 111_4 may receive at least one of data, a control signal, or a synchronization signal from the outside via the local interconnection 200. The LSU 111_4 may transmit at least one of the received data, control signal, or synchronization signal to the CGRA L0 memory 111_2. Similarly, the LSU 111_4 may transfer at least one of the data, control signal, or synchronization signal to the outside via the local interconnection 200.

The neural core 101 may have a CGRA (Coarse Grained Reconfigurable Architecture) structure. Accordingly, in the neural core 101, each of the first type of the plurality of processing elements 111_3a and the second type of the plurality of processing elements 111_3b of the PE array 111_3 may be connected to at least one of the CGRA L0 memory 111_2, the instruction memory 111_1, or the LSU 111_4, respectively. In other words, the first type of the plurality of processing elements 111_3a and the second type of the plurality of processing elements 111_3b do not have to be connected to all of the CGRA L0 memory 111_2, the instruction memory 111_1, and the LSU 111_4, but may be connected to some thereof.

Further, the first type of the plurality of processing elements 111_3a and the second type of the plurality of processing elements 111_3b may be different types of processing elements from each other. Accordingly, out of the CGRA L0 memory 111_2, the instruction memory 111_1, and the LSU 111_4, the elements connected to the first type of the plurality of processing elements 111_3a and the elements connected to the second type of the plurality of processing elements 111_3b may be different from each other.

The neural core 101 of the disclosure having a CGRA structure enables high-level parallel calculations, and since direct data exchange between the first type of the plurality of processing elements 111_3a and the second type of the plurality of processing elements 111_3b is possible, the power consumption may be low. In addition, by including two or more types of processing elements, optimization according to various calculation tasks may also be possible.

For example, if the first type of the plurality of processing elements 111_3a are processing elements that perform two-dimensional calculations, the second type of the plurality of processing elements 111_3b may be processing elements that perform one-dimensional calculations. However, the embodiment is not limited thereto.

In addition, in some embodiments, the CGRA L0 memory 111_2 of the neural core 101 of the disclosure, which has a CGRA structure, may include an adder calculation module that performs one-dimensional calculation and may also further perform one-dimensional calculation of output activation.

That is, in some embodiments, the processing element 111_3a may generate output activation by performing two-dimensional convolution calculation for input activation and a weight. The LSU 111_4 may generate a memory calculation request requesting one-dimensional calculation of summing output activation and target data. The CGRA L0 memory 111_2 may receive the output activation and the memory calculation request, import the target data from a memory address in response to the memory calculation request, generate output data by performing one-dimensional calculation of the target data and the output activation, and store the generated output data in the memory address.

Figure 25:
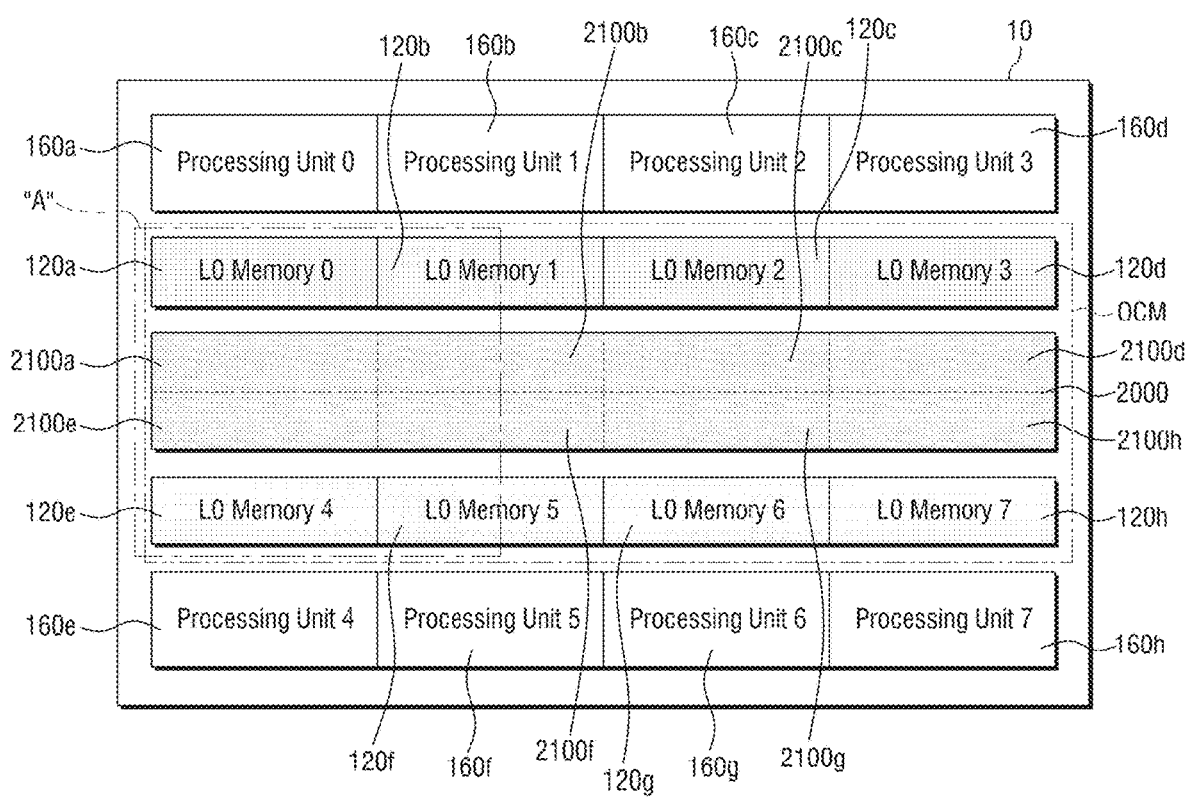
FIG. 25 is a block diagram for illustrating the memory reconstruction of the neural processing system in accordance with some embodiments of the disclosure.

FIG. 25 is a block diagram for illustrating the memory reconstruction of the neural processing system in accordance with some embodiments of the disclosure.

Referring to FIG. 25, the neural core SoC 10 may include first to eighth processing units 160a to 160h and an on-chip memory OCM. Although FIG. 25 illustrates eight processing units as an example, this is merely illustrative, and the number of processing units may vary as desired.

The on-chip memory OCM may include first to eighth L0 memories 120a to 120h and a shared memory 2000.

The first to eighth L0 memories 120a to 120h may be used as private memories for the first to eighth processing units 160a to 160h, respectively. In other words, the first to eighth processing units 160a to 160h and the first to eighth L0 memories 120a to 120h may correspond to each other 1:1.

The shared memory 2000 may include first to eighth memory units 2100a to 2100h. The first to eighth memory units 2100a to 2100h may correspond to the first to eighth processing units 160a to 160h and the first to eighth L0 memories 120a to 120h, respectively. That is, the number of memory units may be eight, which is the same as the number of processing units and L0 memories.

The shared memory 2000 may operate in one of two kinds of on-chip memory types. In other words, the shared memory 2000 may operate in one of a L0 memory type or a global memory type. In other words, the shared memory 2000 may implement two types of logical memories with one piece of hardware.

If the shared memory 2000 is implemented in the L0 memory type, the shared memory 2000 may operate as a private memory for each of the first to eighth processing units 160a to 160h, just like the first to eighth L0 memories 120a to 120h. The L0 memory can operate at a relatively higher clock speed compared with the global memory, and the shared memory 2000 may also use a relatively higher clock speed when operating in the L0 memory type.

If the shared memory 2000 is implemented in the global memory type, the shared memory 2000 may operate as a common memory used by the first processing unit 160a and the second processing unit 160b together. In this case, the shared memory 2000 may be shared not only by the first to eighth processing units 160a to 160h but also by the first to eighth L0 memories 120a to 120h.

The global memory may generally use a lower clock compared with the L0 memory, but is not limited thereto. When the shared memory 2000 operates in the global memory type, the first to eighth processing units 160a to 160h may share the shared memory 2000. In this case, the shared memory 2000 may be connected to the volatile memory 32 of FIG. 2 via the global interconnection 6000 and may also operate as a buffer for the volatile memory 32.

At least part of the shared memory 2000 may operate in the L0 memory type, and the rest may operate in the global memory type. In other words, the entire shared memory 2000 may operate in the L0 memory type, or the entire shared memory 2000 may operate in the global memory type. Alternatively, part of the shared memory 2000 may operate in the L0 memory type, and the rest may operate in the global memory type.

Figure 26:
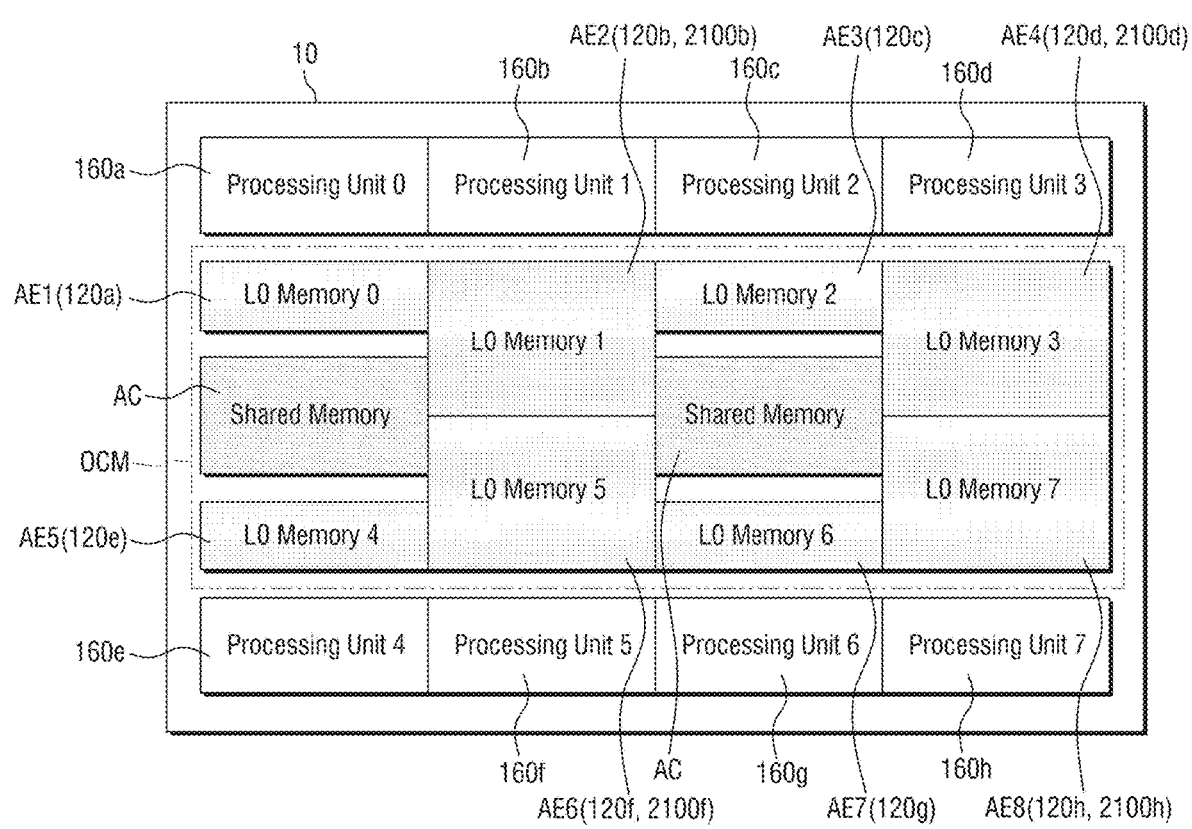
FIG. 26 is a block diagram for illustrating an example of the memory reconstruction of the neural processing system in accordance with some embodiments of the disclosure.

FIG. 26 is a block diagram for illustrating an example of the memory reconstruction of the neural processing system in accordance with some embodiments of the disclosure.

With reference to FIGS. 25 and 26, first, third, fifth, and seventh dedicated areas AE1, AE3, AE5, and AE7 for each of the first, third, fifth, and seventh processing units 160a, 160c, 160e, and 160g may include only the first, third, fifth, and seventh L0 memories 120a, 120c, 120e, and 120g, respectively. Further, second, fourth, sixth, and eighth dedicated areas AE2, AE4, AE6, and AE8 for each of the second, fourth, sixth, and eighth processing units 160b, 160d, 160f, and 160h may include second, fourth, sixth, and eighth L0 memories 120b, 120d, 120f, and 120h, respectively. In addition, the second, fourth, sixth, and eighth dedicated areas AE2, AE4, AE6, and AE8 may include the second, fourth, sixth, and eighth memory units 2100b, 2100d, 2100f, and 2100h. The first, third, fifth, and seventh memory units 2100a, 2100c, 2100e, and 2100g of the shared memory 2000 may be used as a common area AC.

The common area AC may be a memory shared by the first to eighth processing units 160a to 160h. The second dedicated area AE2 may include a second L0 memory 120b and a second memory unit 2100b. The second dedicated area AE2 may be an area in which the second L0 memory 120b and the second memory unit 2100b that are separated hardware-wise operate in the same manner and operate logically as one L0 memory. The fourth, sixth, and eighth dedicated areas AE4, AE6, and AE8 may also operate in the same manner as the second dedicated area AE2.

The shared memory 2000 in accordance with the embodiment may convert an area corresponding to each processing unit into a logical L0 memory and a logical global memory of an optimized ratio and may use them. The shared memory 2000 may perform the adjustment of this ratio at runtime.

That is, each processing unit may perform the same task in some cases, but may perform different tasks in other cases as well. In this case, the amount of the L0 memory and the amount of the global memory required for the tasks carried out by each processing unit are inevitably different each time. Accordingly, if the composition ratio of the L0 memory and the shared memory is fixedly set as in the conventional on-chip memory, there may occur inefficiency due to the calculation tasks assigned to each processing unit.

Figure 27:
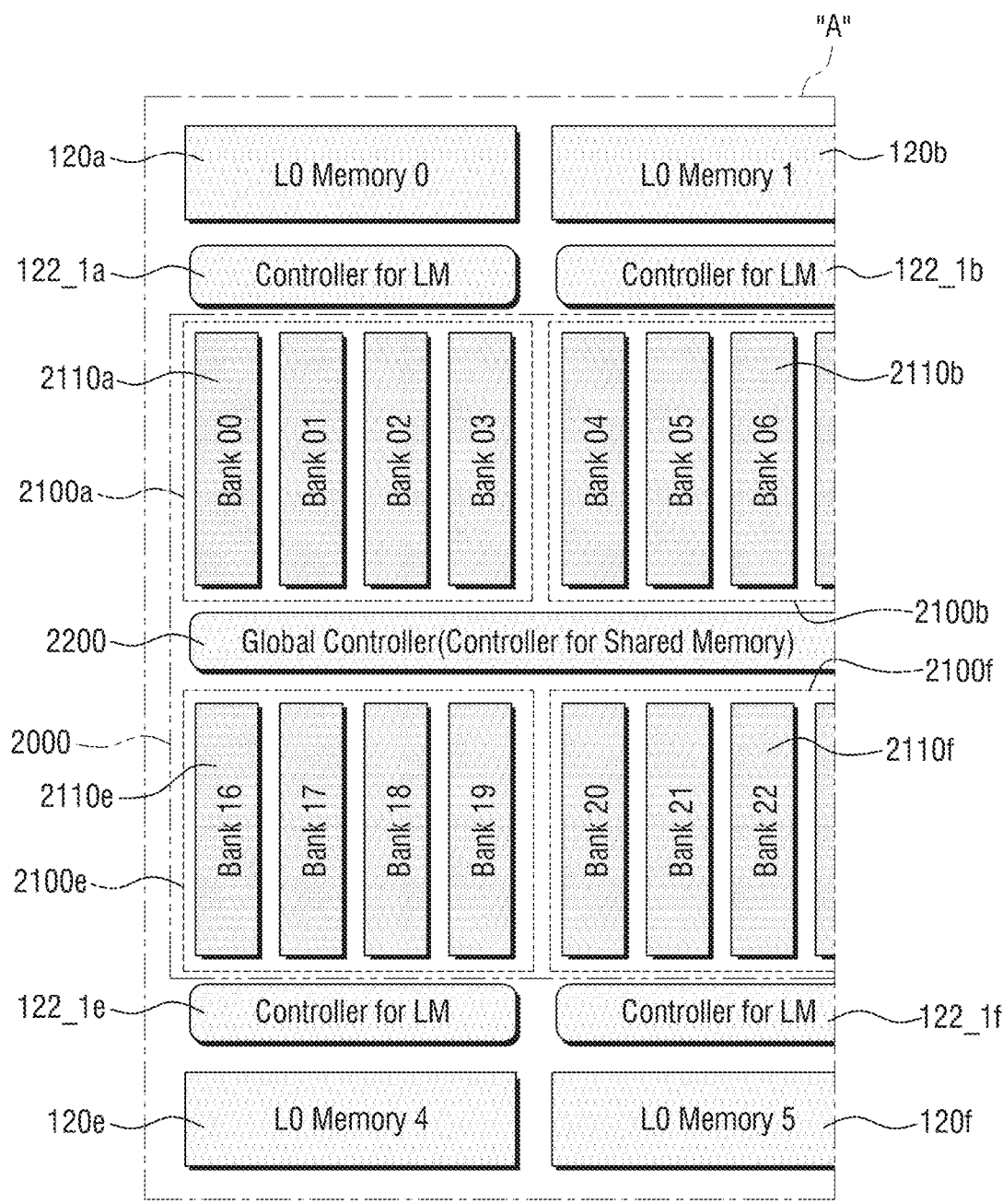
FIG. 27 is an enlarged block diagram of a portion A of FIG. 25.

Therefore, the shared memory 2000 of the neural processing device in accordance with the embodiment may set an optimal ratio of the L0 memory and the global memory according to computation tasks during the runtime, and may enhance the efficiency and speed of computation. FIG. 27 is an enlarged block diagram of a portion A of FIG. 25.

Referring to FIGS. 25 and 27, the shared memory 2000 may include a first L0 memory controller 122_1a, a second L0 memory controller 122_1b, a fifth L0 memory controller 122_1e, a sixth L0 memory controller 122_1f, first to eighth memory units 2100a to 2100h, and a global controller 2200. Other L0 memory controllers not illustrated in FIGS. 25 and 27 may also be included in the embodiment, and descriptions thereof are omitted for the sake of convenience.

The first L0 memory controller 122_1a, the second L0 memory controller 122_1b, the fifth L0 memory controller 122_1e, the sixth L0 memory controller 122_1f, and the global controller 2200 may be referred to respectively as a first L0 memory controller circuit, a second L0 memory controller circuit, a fifth L0 memory controller circuit, a sixth L0 memory controller circuit, and a global controller circuit. However, for the sake of convenience, the terms are respectively unified as a first L0 memory controller, a second L0 memory controller, a fifth L0 memory controller, a sixth L0 memory controller, and a global controller. In addition, the first L0 memory controller 122_1a, the second L0 memory controller 122_1b, the fifth L0 memory controller 122_1e, the sixth L0 memory controller 122_1f, and the global controller 2200 may each be implemented as a circuit or circuitry.

The first L0 memory controller 122_1a may control the first L0 memory 120a. In addition, the first L0 memory controller 122_1a may control the first memory unit 2100a. Specifically, when the first memory unit 2100a is implemented in a logical L0 memory type, the control by the first L0 memory controller 122_1a may be performed on the first memory unit 2100a.

The second L0 memory controller 122_1b may control the second L0 memory 120b. Further, the second L0 memory controller 122_1b may control the second memory unit 2100b. In other words, when the second memory unit 2100b is implemented in the logical L0 memory type, the control by the first L0 memory controller 122_1a may be performed on the second memory unit 2100b.

The fifth L0 memory controller 122_1e may control the fifth L0 memory 120e. Further, the fifth L0 memory controller 122_1e may control the fifth memory unit 2100e. In other words, when the fifth memory unit 2100e is implemented in the logical L0 memory type, the control by the fifth L0 memory controller 122_1e may be performed on the fifth memory unit 2100e.

The sixth L0 memory controller 122_1f may control the sixth L0 memory 120f. Further, the sixth L0 memory controller 122_1f may control the sixth memory unit 2100f. In other words, when the sixth memory unit 2100f is implemented in the logical L0 memory type, the control by the sixth L0 memory controller 122_1f may be performed on the sixth memory unit 2100f.

The global controller 2200 may control all of the first to eighth memory units 2100a to 2100h. Specifically, the global controller 2200 may control the first memory unit 2100a to the eighth memory unit 2100h when the first to eighth memory units 2100a to 2100h each operate logically in the global memory type (i.e., when they do not operate logically in the L0 memory type).

In other words, the first to eighth memory units 2100a to 2100h may be controlled by the first to eighth L0 memory controllers 122_1a to 122_1h, respectively, or may be controlled by the global controller 2200, depending on what type of memory they are logically implemented.

If the L0 memory controllers including the first, second, fifth, and sixth L0 memory controllers 122_1a, 122_1b, 122_1e, and 122_1f control the first to eighth memory units 2100a to 2100h, respectively, the first to eighth L0 memory controllers 122_1a to 122_1h control the first to eighth memory units 2100a to 2100h in the same manner as the first to eighth L0 memories 120a to 120h, and thus, can control them as the private memory of the first to eighth processing units 160a to 160h. Accordingly, the first to eighth memory units 2100a to 2100h may operate at clock frequencies corresponding to the clock frequencies of the first to eighth processing units 160a to 160h.

The L0 memory controllers including the first L0 memory controller 122_1a, the second L0 memory controller 122_1b, the fifth L0 memory controller 122_1e, and the sixth L0 memory controller 122_1f may each include the LSU 110.

If the global controller 2200 controls at least one of the first to eighth memory units 2100a to 2100h, respectively, then the global controller 2200 may control the first to eighth memory units 2100a to 2100h as the global memory of the first to eighth processing units 160a to 160h, respectively. Accordingly, at least one of the first to eighth memory units 2100a to 2100h may operate at a clock frequency independent of the clock frequencies of the first to eighth processing units 160a to 160h, respectively. In some embodiments, if the global controller 2200 controls the i-th memory unit among the first to eighth memory units 2100a to 2100h, the global controller 2200 may control the i-th memory unit as the global memory of the i-th processing unit, and the i-th memory unit may operate at a clock frequency independent of the clock frequency of the i-th processing unit. However, the embodiment is not limited thereto.

The global controller 2200 may connect the first to eighth memory units 2100a to 2100h to the global interconnection 6000 of FIG. 3. The first to eighth memory units 2100a to 2100h may exchange data with the off-chip memory 30 of FIG. 2 by the control of the global controller 2200 or may respectively exchange data with the first to eighth L0 memories 120a to 120h.

Each of the first to eighth memory units 2100a to 2100h may include at least one memory bank. The first memory unit 2100a may include at least one first memory bank 2110a. The first memory banks 2110a may be areas obtained by dividing the first memory unit 2100a into certain sizes. The first memory banks 2110a may all be memory devices of the same size. However, the embodiment is not limited thereto. FIG. 27 illustrates that four memory banks are included in one memory unit.

Similarly, the second, fifth, and sixth memory units 2100b, 2100e, and 2100f may include at least one second, fifth, and sixth memory banks 2110b, 2110e, and 2110f, respectively.

In the following, the description will be made based on the first memory banks 2110a and the fifth memory banks 2110e, which may be the same as other memory banks including the second and sixth memory banks 2110b and 2110f.

The first memory banks 2110a may each operate logically in the L0 memory type or operate logically in the global memory type. In this case, the first memory banks 2110a may operate independently of the other memory banks in the first memory unit 2100a. However, the embodiment is not limited thereto.

If each memory bank operates independently, the first memory unit 2100a may include a first area operating in the same manner as the first L0 memory 120a and a second area operating in a different manner from the first L0 memory 120a. In this case, the first area and the second area do not necessarily coexist, but any one area may take up the entire first memory unit 2100a.

Likewise, the second memory unit 2100b may include a third area operating in the same manner as the second L0 memory 120b and a fourth area operating in a different manner from the second L0 memory 120b. In this case, the third area and the fourth area do not necessarily coexist, and any one area may take up the entire first memory unit 2100a.

In this case, the ratio of the first area to the second area may be different from the ratio of the third area to the fourth area. However, the embodiment is not limited thereto. Therefore, the ratio of the first area to the second area may be the same as the ratio of the third area to the fourth area. In other words, the memory composition ratio in each memory unit may vary as desired.

In general, in the case of the conventional system-on-chip, the on-chip memory except for high-speed L0 memory was often composed of high-density, low-power SRAM. This is because SRAM has high efficiency in terms of chip area and power consumption relative to required capacity. However, with the conventional on-chip memory, the processing speed slowed down significantly as was inevitable in the case where tasks that require more data quickly than the predetermined capacity of the L0 memory, and, even when the need for the global memory is not great, there is no way to utilize the remaining global memory, resulting in inefficiency.

On the other hand, the shared memory 2000 in accordance with some embodiments of the disclosure may be controlled selectively by any one of the two controllers depending on the case. In the case depicted, the shared memory 2000 may be controlled not only as a whole by a determined one of the two controllers but also independently for each memory unit or each memory bank.

Through this, the shared memory 2000 in accordance with the embodiment can obtain an optimal memory composition ratio according to calculation tasks during the runtime and can perform faster and more efficient calculation tasks. In the case of a processing unit specialized in artificial intelligence, the required sizes of L0 memory and global memory may vary for each particular application. Moreover, even for the same application, the required sizes of L0 memory and global memory may vary for each layer when a deep learning network is used. In the shared memory 2000, in accordance with the embodiment, the composition ratio of the memory can be changed during runtime even when calculation steps change according to each layer, making fast and efficient deep learning tasks possible.

Figure 28:
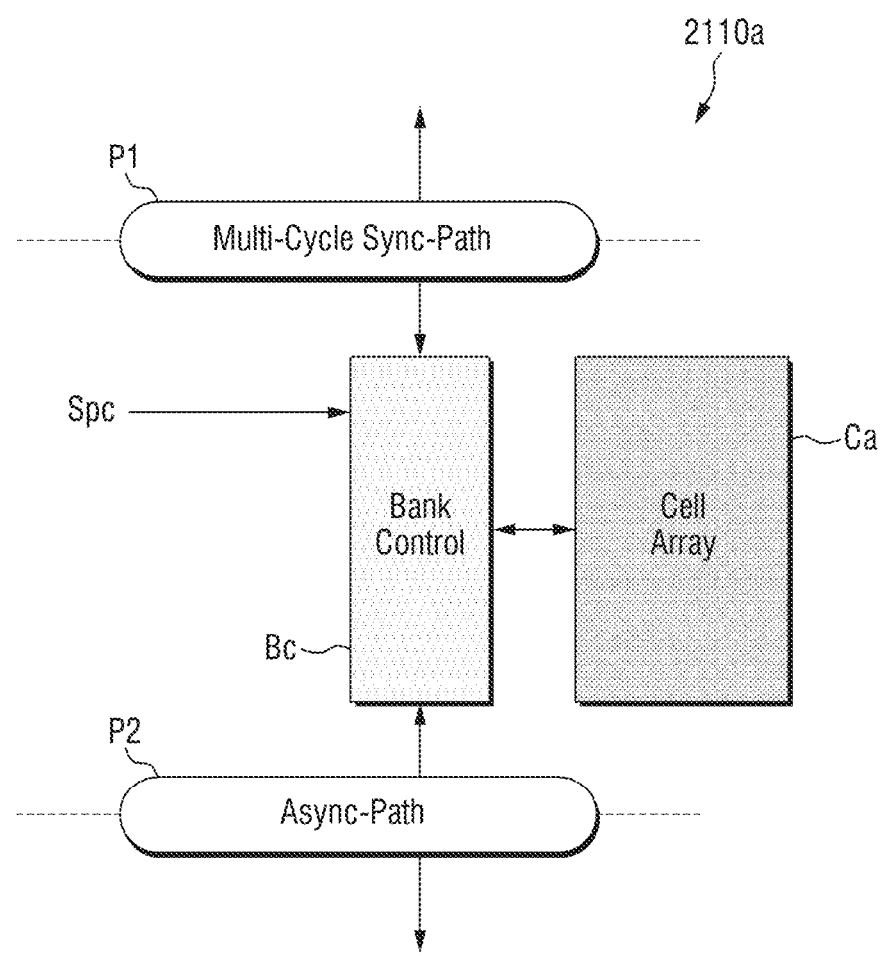
FIG. 28 is a diagram for illustrating the first memory bank of FIG. 27 in detail.

FIG. 28 is a diagram for illustrating the first memory bank of FIG. 27 in detail.

Although FIG. 28 illustrates the first memory bank 2110a, other memory banks may also have the same structure as the first memory bank 2110a.

Referring to FIG. 28, the first memory bank 2110a may include a cell array Ca, a bank controller Bc, a first path unit P1, and a second path unit P2.

In this case, the bank controller Bc, the first path unit P1, and the second path unit P2 may be referred to respectively as a bank controller circuit, a first path unit circuit, and a second path unit circuit. However, for the sake of convenience, the terms are respectively unified as a bank controller, a first path unit, and a second path unit. In addition, the bank controller Bc, the first path unit P1, and the second path unit P2 may each be implemented as a circuit or circuitry.

The cell array Ca may include a plurality of memory devices (cells) therein. In the cell array Ca, the plurality of memory devices may be arranged in a lattice structure. The cell array Ca may be, for example, a SRAM (static random-access memory) cell array.

The bank controller Bc may control the cell array Ca. The bank controller Bc may determine whether the cell array Ca operates in the L0 memory type or in the global memory type, and may control the cell array Ca according to the determined memory type.

Specifically, the bank controller Bc may determine whether to transmit and receive data in the direction of the first path unit P1 or to transmit and receive data in the direction of the second path unit P2 during the runtime. The bank controller Bc may determine a data transmission and reception direction according to a path control signal Spc.

The path control signal Spc may be generated by a pre-designed device driver or compiler. The path control signal Spc may be generated according to the characteristics of calculation tasks. Alternatively, the path control signal Spc may be generated by an input received from a user. In other words, the user may directly apply an input to the path control signal Spc in order to select optimal memory composition ratio.

The bank controller Bc may determine a path along which the data stored in the cell array Ca are transmitted and received via the path control signal Spc. The exchange interface of data may be changed as the bank controller Bc determines the path along which the data are transmitted and received. In other words, a first interface may be used when the bank controller Bc exchanges data with the first path unit P1, and a second interface may be used when the bank controller Bc exchanges data with the second path unit P2. In this case, the first interface and the second interface may be different from each other.

Also, address systems in which data are stored may vary as well. In other words, if a particular interface is selected, then read and write operations may be performed in an address system corresponding thereto.

The bank controller Bc may operate at a particular clock frequency. For example, if the cell array Ca is an SRAM cell array, the bank controller Bc may operate at the operating clock frequency of a general SRAM.

The first path unit P1 may be connected to the bank controller Bc. The first path unit P1 may directly exchange the data of the cell array Ca with the first processing unit 160a. In this case, "directly" may mean being exchanged with each other without going through the global interconnection 6000. In other words, the first processing unit 160a may exchange data directly with the first L0 memory 120a, and the first processing unit 160a may exchange data via the first path unit P1 when the shared memory 2000 is implemented logically in the L0 memory type. The first path unit P1 may include L0 memory controllers including the first L0 memory controller 122_1a and the second L0 memory controller 122_1b as shown in FIG. 27.

The first path unit P1 may form a multi-cycle sync-path. In other words, the operating clock frequency of the first path unit P1 may be the same as the operating clock frequency of the first processing unit 160a. The first L0 memory 120a may quickly exchange data at the same clock frequency as the operating clock frequency of the first processing unit 160a in order to quickly exchange data at the same speed as the operation of the first processing unit 160a.

Likewise, the first path unit P1 may also operate at the same clock frequency as the operating clock frequency of the first processing unit 160a.

In this case, the operating clock frequency of the first path unit P1 may be multiples of the operating clock frequency of the bank controller Bc. In this case, a clock domain crossing (CDC) operation for synchronizing the clocks between the bank controller Bc and the first path unit P1 is not required separately, and thus, a delay of data transmission may not occur. Accordingly, faster and more efficient data exchange can be possible.

In the embodiment shown in FIG. 28, an operating clock frequency of the first path unit P1 may be 1.5 GHZ, as an example. This may be twice the frequency of 750 MHz of the bank controller Bc. However, the embodiment is not limited thereto, and any operating clock frequency of the first path unit P1 may be possible as long as the first path unit P1 operates at integer multiples of the clock frequency of the bank controller Bc.

The second path unit P2 may be connected to the bank controller Bc. The second path unit P2 may exchange the data of the cell array Ca with the first processing unit 160a not directly but via the global interconnection 6000. In other words, the first processing unit 160a may exchange data with the cell array Ca via the global interconnection 6000 and the second path unit P2. In this case, the cell array Ca may exchange data not only with the first processing unit 160a but also with other processing units.

In other words, the second path unit P2 may be a data exchange path between the cell array Ca and all the processing units when the first memory bank 2110a is implemented logically in the global memory type. The second path unit P2 may include the global controller 2200 of FIG. 27.

The second path unit P2 may form an asynchronous path or Async-Path. The operating clock frequency of the second path unit P2 may be the same as the operating clock frequency of the global interconnection 6000. Likewise, the second path unit P2 may also operate at the same clock frequency as the operating clock frequency of the global interconnection 6000.

In the case of the embodiment as shown in FIG. 28, the operating clock frequency of the second path unit P2 may not be synchronized with the operating clock frequency of the bank controller Bc. In this case, the clock domain crossing (CDC) operation for synchronizing the clocks between the bank controller Bc and the second path unit P2 may be required. If the operating clock frequency of the bank controller Bc and the operating clock frequency of the second path unit P2 are not synchronized with each other, the degree of freedom in the design of the clock domain may be relatively high. Therefore, the difficulty of hardware design is decreased, thereby making it possible to more easily derive the desired hardware operation.

The bank controller Bc may use different address systems in the case of exchanging data via the first path unit P1 and in the case of exchanging data via the second path unit P2. In other words, the bank controller Bc may use a first address system if exchanging data via the first path unit P1 and a second address system if exchanging data via the second path unit P2. In this case, the first address system and the second address system may be different from each other.

A bank controller Bc is not necessarily required for each memory bank. In other words, a bank controller Bc may not be used to schedule, but instead serves to transfer signals, and thus, is not a required component for each memory bank having two ports. Therefore, one bank controller Bc can be operably coupled to control multiple memory banks. The multiple memory banks may operate independently even if they are controlled by the bank controller Bc. However, the embodiment is not limited thereto.

As a matter of course, the bank controller Bc may exist for each memory bank. In this case, the bank controller Bc may control each memory bank individually.

Referring to FIG. 27 and FIG. 28, if the first memory unit 2100*a* exchanges data via the first path unit P1, the first address system may be used. If the first memory unit 2100*a* exchanges data via the second path unit P2, the second address system may be used. Similarly, if the second memory unit 2100*b* exchanges data via the first path unit P1, a third address system may be used. If the second memory unit 2100*b* exchanges data via the second path unit P2, the second address system may be used. In this case, the first address system and the third address system may be the same as each other. However, the embodiment is not limited thereto.

The first address system and the third address system may each be used exclusively for the first processing unit 160*a* and the second processing unit 160*b*, respectively. The second address system may be commonly applied to the first processing unit 160*a* and the second processing unit 160*b*.

In FIG. 28, the operating clock frequency of the second path unit P2 may operate at 1 GHZ, as an example. This may be a frequency that is not synchronized with the operating clock frequency of 750 MHz of the bank controller Bc. In other words, the operating clock frequency of the second path unit P2 may be freely set without being dependent on the operating clock frequency of the bank controller Bc at all.

A generic global memory has used slow SRAM (e.g., 750 MHZ) and a global interconnection (e.g., 1 GHZ) faster than that, inevitably resulting in delays due to the CDC operation. On the other hand, the shared memory 2000 in accordance with some embodiments has room to use the first path unit P1 in addition to the second path unit P2, thereby making it possible to avoid delays resulting from the CDC operation.

Furthermore, in the generic global memory, a plurality of processing units uses one global interconnection 6000, and thus, when an amount of data transfer occurs at the same time, the decrease in the overall processing speed is likely to occur. On the other hand, the shared memory 2000 in accordance with some embodiments has room to use the first path unit P1 in addition to the second path unit P2, thereby making it possible to achieve the effect of properly distributing the data throughput that could be concentrated on the global controller 2200 as well.

Figure 29:
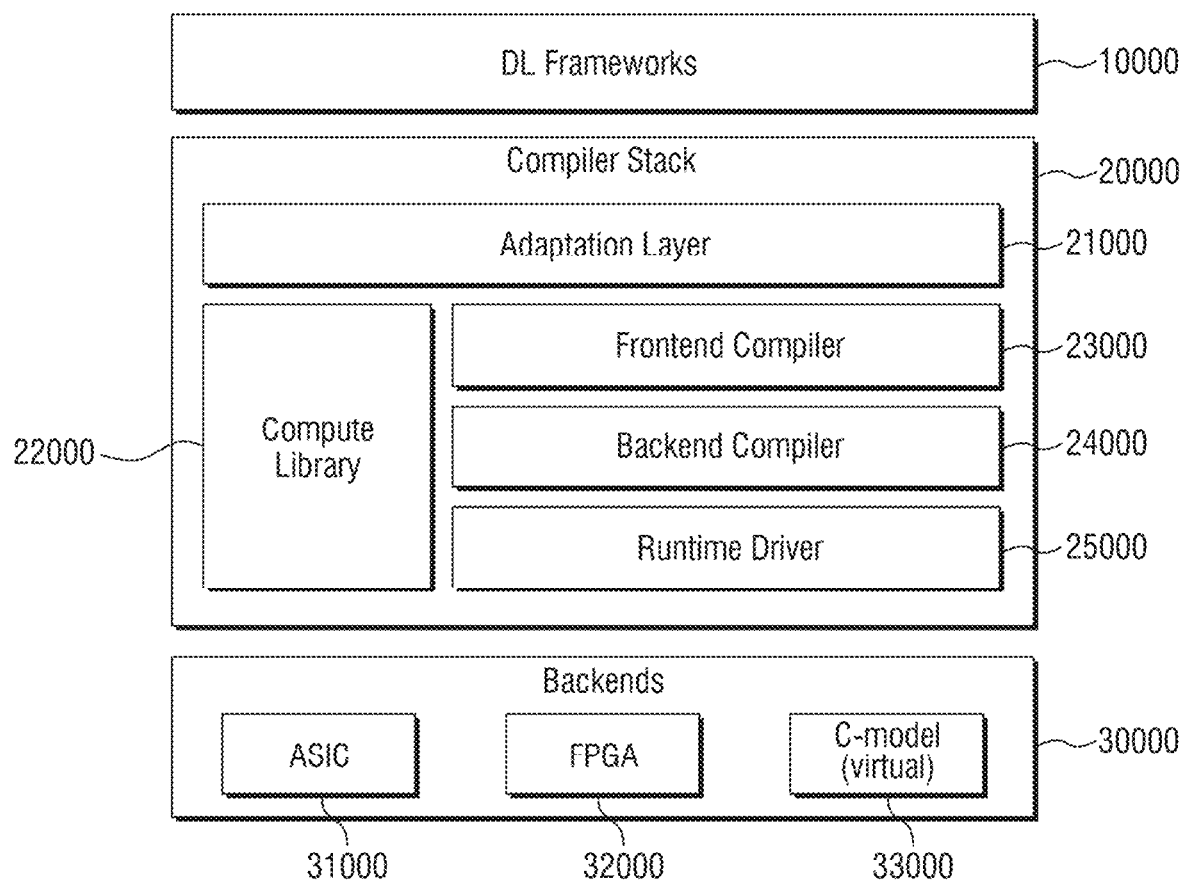
FIG. 29 is a block diagram for illustrating a software hierarchy of a neural processing device in accordance with some embodiments of the disclosure.

FIG. 29 is a block diagram for illustrating a software hierarchy of a neural processing device in accordance with some embodiments of the disclosure.

Referring to FIG. 29, the software hierarchy of the neural processing device in accordance with some embodiments may include a deep learning (DL) framework 10000, a compiler stack 20000, and a back-end module 30000.

The DL framework 10000 may mean a framework for a deep learning model network used by a user. For example, a neural network that has finished training may be generated using a program such as TensorFlow or PyTorch.

The compiler stack 20000 may include an adaptation layer 21000, a compute library 22000, a front-end compiler 23000, a back-end compiler 24000, and a runtime driver 25000.

The adaptation layer 21000 may be a layer in contact with the DL framework 10000. The adaptation layer 21000 may quantize a neural network model of a user generated by the DL framework 10000 and modify graphs. In addition, the adaptation layer 21000 may convert a type of model into a required type.

The front-end compiler 23000 may convert various neural network models and graphs transferred from the adaptation layer 21000 into a constant intermediate representation (IR). The converted IR may be a preset representation that is easy to handle later by the back-end compiler 24000.

The optimization that can be done in advance in the graph level may be performed on such an IR of the front-end compiler 23000. In addition, the front-end compiler 23000 may finally generate the IR through the task of converting it into a layout optimized for hardware.

The back-end compiler 24000 optimizes the IR converted by the front-end compiler 23000 and converts it into a binary file, enabling it to be used by the runtime driver. The back-end compiler 24000 may generate an optimized code by dividing a job at a scale that fits the details of hardware.

The compute library 22000 may store template operations designed in a form suitable for hardware among various operations. The compute library 22000 provides the back-end compiler 24000 with multiple template operations required by hardware, allowing the optimized code to be generated.

The runtime driver 25000 may continuously perform monitoring during driving, thereby making it possible to drive the neural network device in accordance with some embodiments. Specifically, it may be responsible for the execution of an interface of the neural network device.

The back-end module 30000 may include an ASIC (application-specific integrated circuit) 31000, an FPGA (field-programmable gate array) 32000, and a C-model 33000. The ASIC 31000 may refer to a hardware chip determined according to a predetermined design method. The FPGA 32000 may be a programmable hardware chip. The C-model 33000 may refer to a model implemented by simulating hardware on software.

The back-end module 30000 may perform various tasks and derive results by using the binary code generated through the compiler stack 20000.

Figure 30:
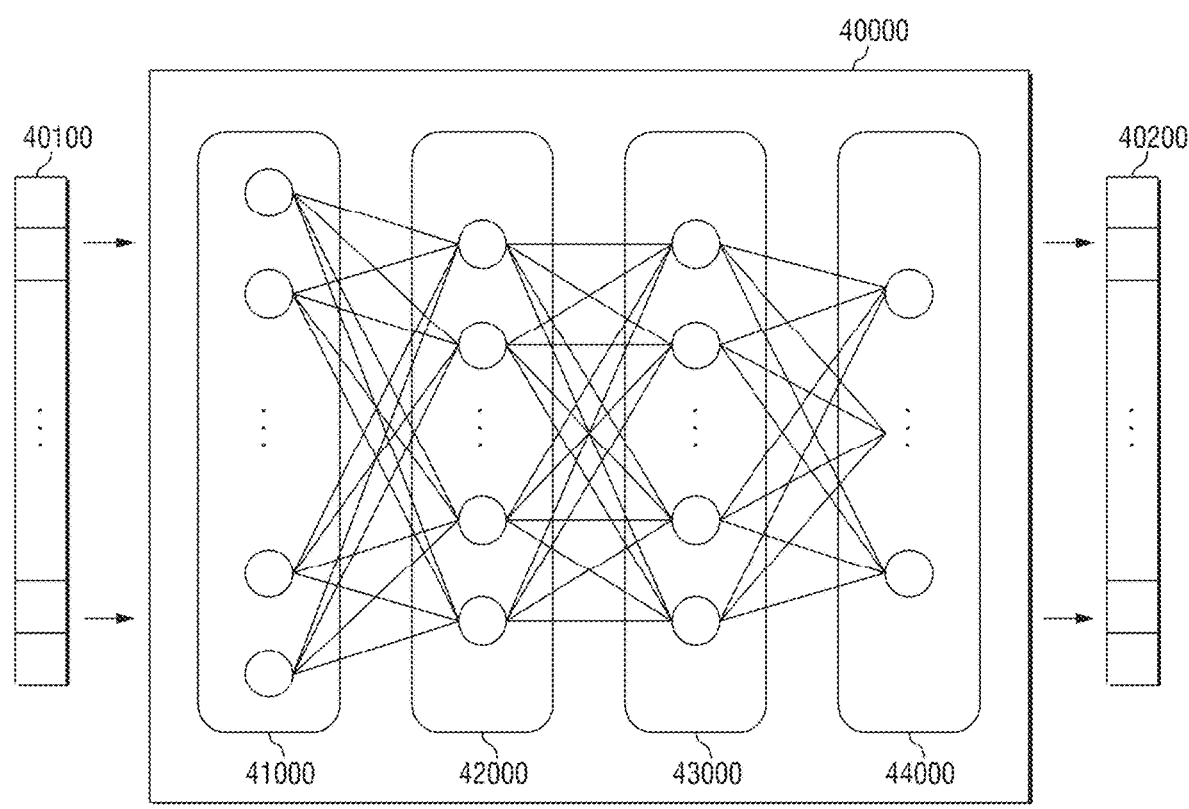
FIG. 30 is a conceptual diagram for illustrating deep learning calculations performed by a neural processing device in accordance with some embodiments of the disclosure.

FIG. 30 is a conceptual diagram for illustrating deep learning calculations performed by a neural processing device in accordance with some embodiments of the disclosure.

Referring to FIG. 30, an artificial neural network model 40000 is one example of a machine learning model and is a statistical learning algorithm implemented based on the structure of a biological neural network or is a structure for executing the algorithm, in machine learning technology and cognitive science.

The artificial neural network model 40000 may represent a machine learning model having an ability to solve problems by learning to reduce the error between an accurate output corresponding to a particular input and an inferred output by repeatedly adjusting the weight of the synapse by nodes. Nodes are artificial neurons that have formed a network by combining synapses, as in a biological neural network. For example, the artificial neural network model 40000 may include any probabilistic model, neural network model, etc., used in artificial intelligence learning methods such as machine learning and deep learning.

A neural processing device in accordance with some embodiments may implement the form of such an artificial neural network model 40000 and perform calculations. For example, the artificial neural network model 40000 may receive an input image and may output information on at least a part of an object included in the input image.

Figure 31:
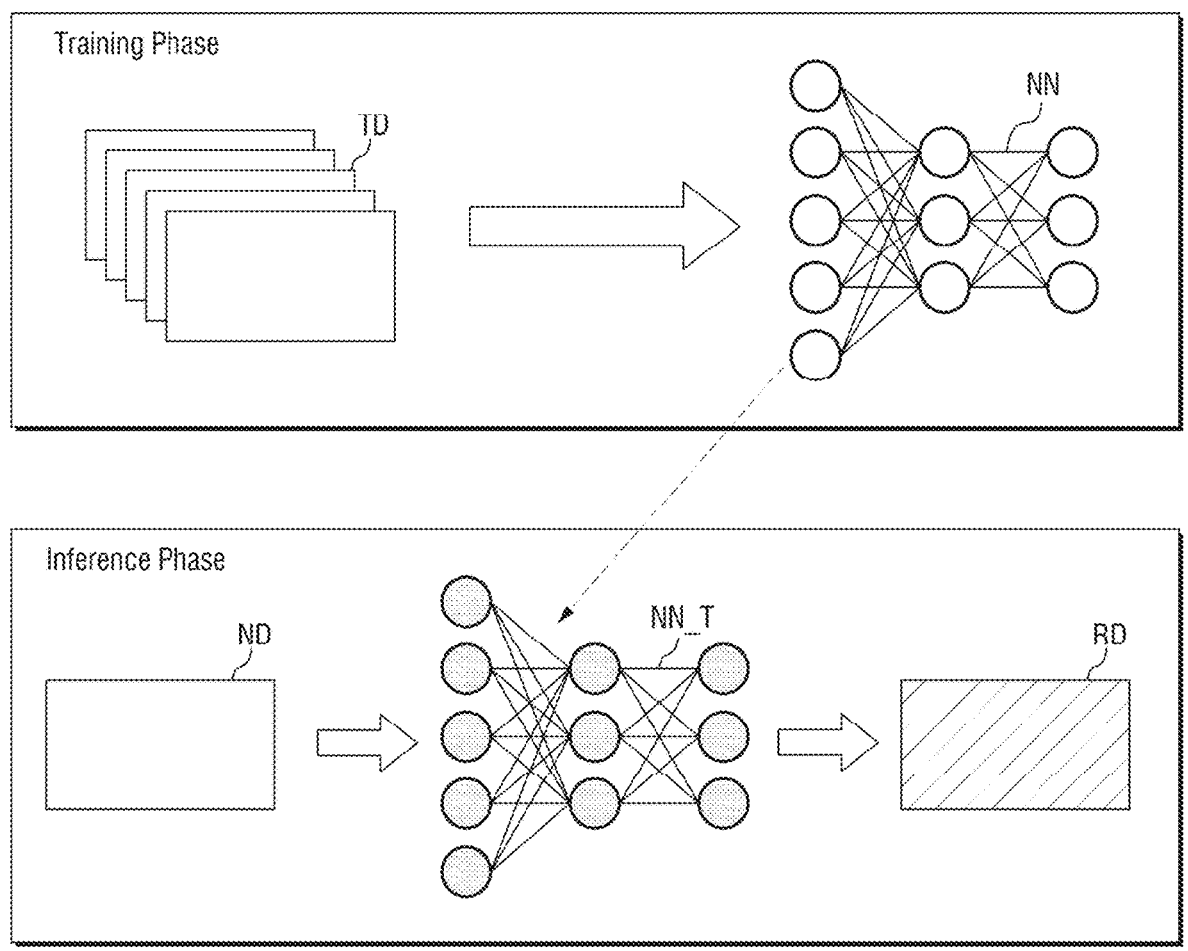
FIG. 31 is a conceptual diagram for illustrating training and inference operations of a neural network of a neural processing device in accordance with some embodiments of the disclosure.

The artificial neural network model 40000 may be implemented by a multilayer perceptron (MLP) including multilayer nodes and connections between them. An artificial neural network model 40000 in accordance with the embodiment may be implemented using one of various artificial neural network model structures including the MLP. As shown in FIG. 31, the artificial neural network model 40000 includes an input layer 41000 that receives input signals or data 40100 from the outside, an output layer 44000 that outputs output signals or data 40200 corresponding to the input data, and n (where n is a positive integer) hidden layers 42000 to 43000 that are located between the input layer 41000 and the output layer 44000 and that receive a signal from the input layer 41000, extract characteristics, and forward them to the output layer 44000. Here, the output layer 44000 receives signals from the hidden layers 42000 to 43000 and outputs them to the outside.

The learning methods of the artificial neural network model 40000 include a supervised learning method for training to be optimized to solve a problem by the input of supervisory signals (correct answers), and an unsupervised learning method that does not require supervisory signals.

The neural processing device may directly generate training data, through simulations, for training the artificial neural network model 40000. In this way, by matching a plurality of input variables and a plurality of output variables corresponding thereto with the input layer 41000 and the output layer 44000 of the artificial neural network model 40000, respectively, and adjusting the synaptic values between the nodes included in the input layer 41000, the hidden layers 42000 to 43000, and the output layer 44000, training may be made to enable a correct output corresponding to a particular input to be extracted. Through such a training phase, it is possible to identify the characteristics hidden in the input variables of the artificial neural network model 40000, and to adjust synaptic values (or weights) between the nodes of the artificial neural network model 40000 so that an error between an output variable calculated based on an input variable and a target output is reduced.

FIG. 31 is a conceptual diagram for illustrating training and inference operations of a neural network of a neural processing device in accordance with some embodiments of the disclosure.

Referring to FIG. 31, the training phase may be subjected to a process in which a large number of pieces of training data TD are passed forward to the artificial neural network model NN and are passed backward again. Through this, the weights and biases of each node of the artificial neural network model NN are tuned, and training may be performed so that more and more accurate results can be derived. Through the training phase, the artificial neural network model NN may be converted into a trained neural network model NN_T.

In the inference phase, new data ND may be inputted into the trained neural network model NN_T again. The trained neural network model NN_T may derive result data RD through the weights and biases that have already been used in the training, with the new data ND as input. For such result data RD, what training data TD were used in training and how many pieces of training data TD were used in the training phase may be important.

Hereinafter, a data processing method of a neural core according to some embodiments of the disclosure is described with reference to FIGS. 32 and 33. Descriptions previously given with reference to the above-described embodiments will be omitted or simplified. A data processing method according to the embodiment may be performed by the neural core according to the above-described embodiment, and in order to describe the data processing method, FIGS. 1 to 31 and above descriptions related thereto may be used as a reference.

Figure 32:
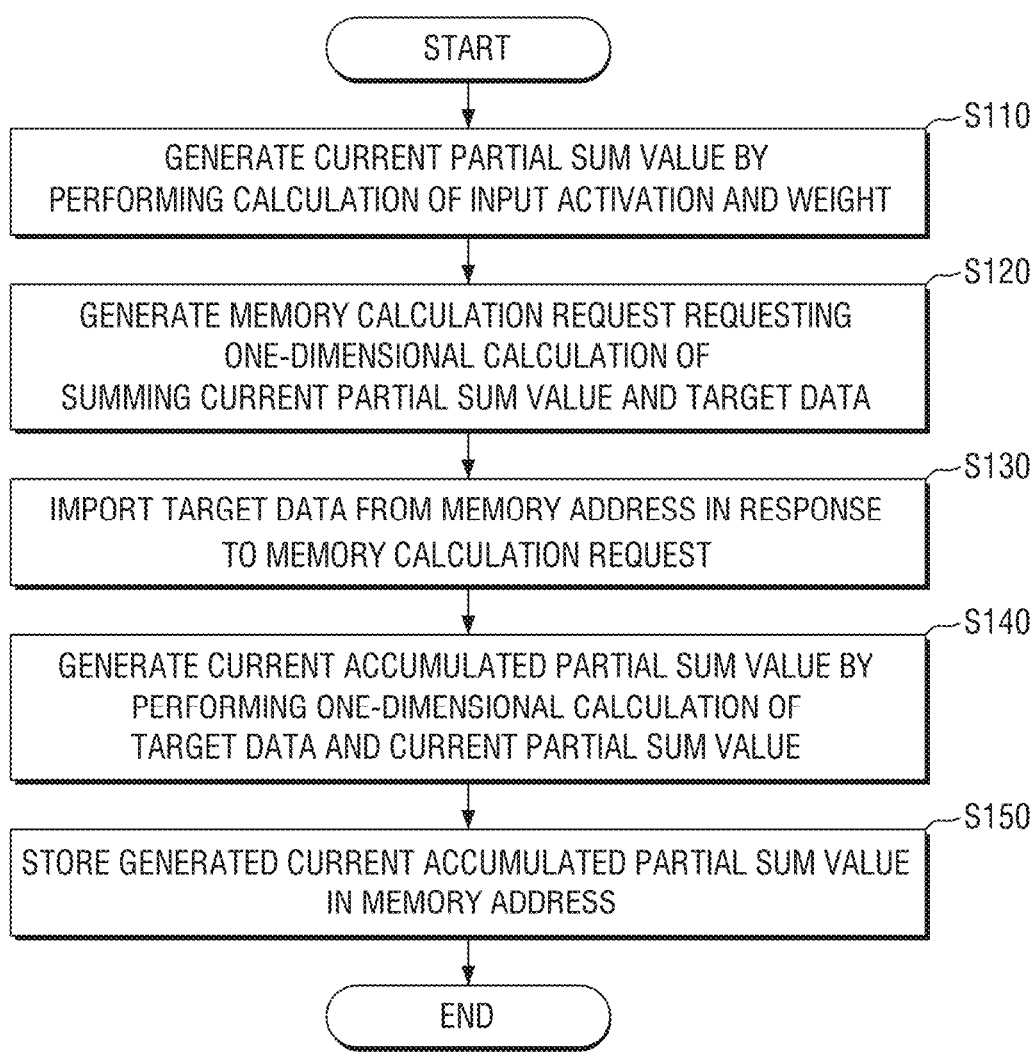
FIG. 32 is a flowchart for illustrating a data processing method of a neural core according to some embodiments of the disclosure.
Figure 33:
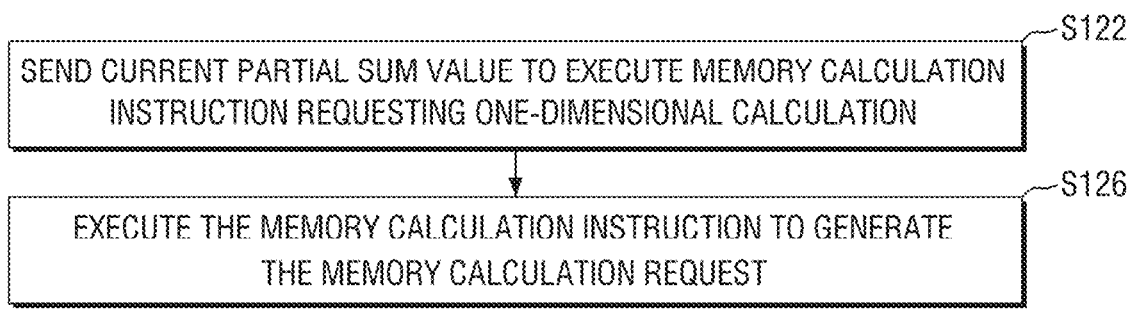
FIG. 33 is a flowchart for illustrating a process of generating a memory calculation request.

FIG. 32 is a flowchart for illustrating a data processing method of a neural core according to some embodiments of the disclosure, and FIG. 33 is a flowchart for illustrating a process of generating a memory calculation request.

Referring to FIG. 32, the data processing method of the neural core according to some embodiments of the disclosure may include generating current partial sum value by performing calculation of input activation and a weight at S110, generating a memory calculation request requesting one-dimensional calculation of summing the current partial sum value and target data at S120, importing the target data from a memory address in response to the memory calculation request at S130, generating the current accumulated partial sum value by performing one-dimensional calculation of the target data and a partial sum for the output activation at S140, and storing the current accumulated partial sum value in the memory address at S150.

First, current partial sum value is generated by performing calculation of input activation and a weight at S110.

The processing unit 160 may perform two-dimensional matrix calculation, that is, convolution calculation. The processing unit 160 may receive input activation Act_In, multiply the input activation by a weight, and then generate current partial sum value psum for the output activation Act_Out.

At S110, the PE array 163 of the processing unit 160 may receive the input activation Act_In and the weight via the column register 161 and the row register 162. The PE array 163 may multiply the received input activation Act_In by the weight. In this case, the input activation Act_In and the weight may be calculated through convolution in a form of matrix.

Next, a memory calculation request requesting one-dimensional calculation of summing the current partial sum value and the target data is generated at S120.

Referring to FIG. 33, the operation S120 may include sending a current partial sum value psum for the output activation Act_Out requesting the memory load/store unit MLSU to execute a memory calculation instruction requesting one-dimensional calculation of the output activation at S122, and execute the memory calculation instruction MI to generate the memory calculation request at S126.

At S122, the calculation control unit 164 may send the current partial sum value psum for the output activation Act_Out requesting the memory load/store unit MLSU to execute a memory calculation instruction MI requesting one-dimensional calculation. In this case, the one-dimensional calculation may indicate calculation of accumulating or summing two input values. In some embodiments, the calculation control unit 164 may check whether one-dimensional calculation is required for the current partial sum value psum for the output activation Act_Out, and when one-dimensional calculation is further required, the memory load/store unit MLSU may execute the memory calculation instruction MI requesting the one-dimensional calculation.

At S126, the memory load/store unit MLSU may execute the memory calculation instruction MI to generate the memory calculation request MR requesting to import the target data stored in the address indicated by the memory calculation instruction MI and input the target data to the adder calculation module acm. Also, the memory load/store unit MLSU may transmit the generated memory calculation request MR and the current partial sum value psum for the output activation Act_Out to the L0 memory 120.

Next, the target data is imported from a memory address in accordance with a memory calculation request at S130, and current accumulated partial sum value is generated by performing one-dimensional calculation of the target data and the current partial sum value psum for the output activation Act_Out at S140.

At S130, the current partial sum value psum for the output activation Act_Out may be provided as a first input value a first input of the adder calculation module acm. The target data stored in the memory address included in the memory operation request MR may be imported and provided as a second input value of the adder calculation module acm.

At S140, the adder calculation module acm may calculate an output value by summing the first input value the first input and the second input value a second input.

Next, the generated current accumulated partial sum value is stored in the memory address at S150.

The memory calculation request MR may include storing an output value output from the adder calculation module acm in an address where the target data was stored. Accordingly, at S150, the generated current accumulated partial sum value may be stored in the corresponding memory address.

In the neural core, the neural processor, and the data processing method thereof according to the disclosure, the neural core may perform two-dimensional convolution calculation, and an on-chip memory may perform one-dimensional calculation, and thus, it is possible to ameliorate the problems of reduction in efficiency and balancing of data processing, which occurs because a processing unit performs both the two-dimensional convolution and the one-dimensional calculation.

In addition, in the neural core, the neural processor, and the data processing method thereof according to the disclosure, one-dimensional calculation is performed by a memory without importing functions and data for one-dimensional calculation operation into a processing unit, and thus, power consumption and energy may be reduced.

In some embodiments, blocks, units, modules, and components as describe above may be implemented as a circuit or circuitry. Blocks, units, modules, and components which perform processing may be referred to as a processor, a processing circuit, a processor circuit, or a processing circuitry. Blocks, units, modules, and components which store data may be referred to as a memory, a memory circuit, or a memory circuitry.

Hereinafter, various aspects will be described.

In some aspects, a neural processing device, comprises: a memory comprising adding circuitry and a plurality of memory cells; and a processor operably coupled to the memory. The processor is configured to cause: receiving input activation values and weight values for a neural network, performing a weighted-sum of the input activation values with the weight values to generate a partial sum value for the neural network, and requesting the memory to add the generated partial sum value and a previous accumulated partial sum value in a memory cell referenced by a memory address by using the adding circuitry within the memory to generate a current accumulated partial sum value for the neural network and to store the current accumulated partial sum value in the memory cell referenced by the memory address.

In some aspects, the processing device further comprises: load-store unit circuitry configured to load and store operations between the memory and the processor. Requesting the memory further comprises: sending the generated partial sum value to the load-store unit circuitry.

In some aspects, the load-store unit circuitry is configured to cause: in response to receiving the generated partial sum value, executing an instruction to send a request requesting the memory to add the generated partial sum value and the previous accumulated partial sum value stored in the memory cell referenced by the memory address indicated by the instruction by using the adding circuitry within the memory to generate the current accumulated partial sum value and to store the current accumulated partial sum value in the memory cell referenced by the memory address indicated by the instruction.

In some aspects, the memory is configured to cause: in response to receiving the request, reading the previous accumulated partial sum value stored in the memory cell referenced by the memory address indicated by the request, adding, by using the adding circuitry within the memory, the generated partial sum value indicated by the request and the previous accumulated partial sum value to generate the current accumulated partial sum value, and storing the current accumulated partial sum value in the memory cell referenced by the memory address indicated by the request.

In some aspects, the adding circuitry is associated with a set of memory cells belonging to a bank in the memory.

In some aspects, the previous accumulated partial sum value stored in the memory cell referenced by the memory address is read and the current accumulated partial sum value is stored via a port which is used by both the adding circuitry and a controller controlling the bank.

In some aspects, the memory comprises a plurality of ports which are used to read and write data in the set of memory cells.

In some aspects, the previous accumulated partial sum value stored in the memory cell referenced by the memory address is read and the current accumulated partial sum value is stored via a port which is determined as an unused port among the plurality of ports.

In some aspects, the previous accumulated partial sum value stored in the memory cell referenced by the memory address is read and the current accumulated partial sum value is stored via a port which is dedicated to the adding circuitry among the plurality of ports.

In some aspects, the adding circuitry comprises a plurality of adding circuits, and each of the plurality of adding circuits is associated with a respective one of the plurality of memory cells. Adding the generated partial sum value and the previous accumulated partial sum value comprises: adding, by an adding circuit associated with the memory cell referenced by the memory address, the generated partial sum value and the previous accumulated partial sum value to generate the current accumulated partial sum value.

In some aspects, a neural processing device, comprises: a memory comprising one-dimensional calculation circuitry and a plurality of memory cells; and a processor operably coupled to the memory. The processor is configured to cause: receiving input activation values and weight values for a neural network, performing a two-dimensional calculation with the input activation values and the weight values to generate a first value for the neural network, and requesting the memory to perform a one-dimensional calculation with the first value and a second value in a memory cell referenced by a memory address by using the one-dimensional calculation circuitry within the memory to generate a third value for the neural network and to store the third value in the memory cell referenced by the memory address.

In some aspects, the processing device further comprises: load-store unit circuitry configured to load and store operations between the memory and the processor. Requesting the memory further comprises: sending the first value for the neural network to the load-store unit circuitry.

In some aspects, the load-store unit circuitry is configured to cause: load the input activation values and the weight values from the memory to send the input activation values and the weight values to the processor, in response to receiving the first value, executing an instruction to send a request requesting the memory to perform the one-dimensional calculation with the first value and the second value stored in the memory cell referenced by the memory address indicated by the instruction by using the one-dimensional calculation circuitry within the memory to generate the third value and to store the third value in the memory cell referenced by the memory address indicated by the instruction.

In some aspects, the memory is configured to cause: in response to receiving the request, reading the second value stored in the memory cell referenced by the memory address indicated by the request without using the load-store unit circuitry, performing the one-dimensional calculation with the first value and the second value to generate the third value by using the one-dimensional calculation circuitry within the memory, and storing the third in the memory cell referenced by the memory address indicated by the request.

In some aspects, a method is performed by a processing device comprising a memory and a processor operably coupled to the memory. The memory comprises adding circuitry and a plurality of memory cells. The method comprises: receiving, by the processor, input activation values and weight values for a neural network; performing, by the processor, a weighted-sum of the input activation values with the weight values to generate a partial sum value; and requesting, by the processor, the memory to add the generated partial sum value and a previous accumulated partial sum value stored in a memory cell referenced by a memory address by using the adding circuitry within the memory to generate a current accumulated partial sum value and to store the current accumulated partial sum value in the memory cell referenced by the memory address.

In some aspects, the processing device further comprises load-store unit circuitry configured to load and store operations between the memory and the processor. The method further comprises: sending, by the processor, the generated partial sum value to the load-store unit circuitry.

In some aspects, the method further comprises: in response to receiving the generated partial sum value, executing an instruction to send, by the load-store unit circuitry, a request requesting the memory to add the generated partial sum value and the previous accumulated partial sum value stored in the memory cell referenced by the memory address indicated by the instruction by using the adding circuitry within the memory to generate the current accumulated partial sum value and to store the current accumulated partial sum value in the memory cell referenced by the memory address indicated by the instruction.

In some aspects, the method further comprises: reading, by the adding circuitry within the memory, the previous accumulated partial sum value stored in the memory cell referenced by the memory address indicated by the request in response to receiving the request; adding, by the adding circuitry within the memory, the generated partial sum value and the previous accumulated partial sum value to generate the current accumulated partial sum value; and storing the current accumulated partial sum value in the memory cell referenced by the memory address indicated by the request.

In some aspects, the adding circuitry is associated with a set of memory cells belonging to a bank in the memory.

In some aspects, the previous accumulated partial sum value stored in the memory cell referenced by the memory address is read and the current accumulated partial sum value is stored via a port which is used by both the adding circuitry and a controller controlling the bank.

The above descriptions are merely examples of the technical idea of the embodiment, and those skilled in the art may perform various modifications and variations without departing from the essential characteristics of the embodiment. Therefore, the embodiments are not intended to limit the technical idea of the embodiment, but to describe the technical idea, and the scope of the technical idea of the embodiment is not limited to the embodiments. The scope of protection of the embodiment should be construed according to the claims below, and all technical ideas within the scope equivalent thereto should be construed as being included in the scope of rights of the embodiments.

What is claimed is:

1. A neural processing device, comprising:
a memory comprising one-dimensional calculation circuitry and a plurality of memory cells; and
a processor operably coupled to the memory,
wherein the processor is configured to cause:
receiving input activation values and weight values for a neural network;
performing a two-dimensional calculation with the input activation values and the weight values to generate a first value for the neural network; and
requesting the memory to perform a one-dimensional calculation with the first value and a second value in a memory cell referenced by a memory address by using the one-dimensional calculation circuitry within the memory to generate a third value for the neural network and to store the third value in the memory cell referenced by the memory address.

2. The processing device of claim 1, further comprising:
load-store unit circuitry configured to load and store operations between the memory and the processor,
wherein requesting the memory further comprises:
sending the first value for the neural network to the load-store unit circuitry.

3. The processing device of claim 2,
wherein the load-store unit circuitry is configured to cause:
loading the input activation values and the weight values from the memory to send the input activation values and the weight values to the processor;
in response to receiving the first value, executing an instruction to send a request requesting the memory to perform the one-dimensional calculation with the first value and the second value stored in the memory cell referenced by the memory address indicated by the instruction by using the one-dimensional calculation circuitry within the memory to generate the third value and to store the third value in the memory cell referenced by the memory address indicated by the instruction.

4. The processing device of claim 3,
wherein the memory is configured to cause:
in response to receiving the request, reading the second value stored in the memory cell referenced by the memory address indicated by the request without using the load-store unit circuitry;

performing the one-dimensional calculation with the first value and the second value to generate the third value by using the one-dimensional calculation circuitry within the memory; and storing the third value in the memory cell referenced by the memory address indicated by the request.

5. A method performed by a processing device comprising a memory and a processor operably coupled to the memory, wherein the memory comprises one-dimensional calculation circuitry and a plurality of memory cells, the method comprising:

receiving, by the processor, input activation values and weight values for a neural network;

performing, by the processor, a two-dimensional calculation with the input activation values and the weight values to generate a first value for the neural network; and requesting, by the processor, the memory to perform a one-dimensional calculation with the first value and a second value in a memory cell referenced by a memory address by using the one-dimensional calculation circuitry within the memory to generate a third value for the neural network and to store the third value for the neural network in the memory cell referenced by the memory address.

6. The method of claim 5, wherein the processing device further comprises load-store unit circuitry configured to load and store operations between the memory and the processor, the method further comprising:

sending, by the processor, the first value for the neural network to the load-store unit circuitry.

7. The method of claim 6, further comprising:

loading, by the load-store unit circuitry, the input activation values and the weight values from the memory to send the input activation values and the weight values to the processor; and in response to receiving the first value, executing, by the load-store unit circuitry, an instruction to send a request requesting the memory to perform the one-dimensional calculation with the first value and the second value stored in the memory cell referenced by the memory address indicated by the instruction by using the one-dimensional calculation circuitry within the memory to generate the third value and to store the third value in the memory cell referenced by the memory address indicated by the instruction.

8. The method of claim 7, further comprising in response to receiving the request, reading, by the one-dimensional calculation circuitry within the memory, the second value stored in the memory cell referenced by the memory address indicated by the request without using the load-store unit circuitry;

performing, by the one-dimensional calculation circuitry within the memory, the one-dimensional calculation with the first value and the second value to generate the third value; and storing the third value in the memory cell referenced by the memory address indicated by the request.

9. The method of claim 8, wherein the one-dimensional calculation circuitry is associated with a set of memory cells belonging to a bank in the memory.

10. The method of claim 9, wherein the second value stored in the memory cell referenced by the memory address is read and the third value is stored via a port which is used by both the one-dimensional calculation circuitry and a controller controlling the bank.

* * * * *